US010666911B2

(12) United States Patent
Siminoff et al.

(10) Patent No.: US 10,666,911 B2
(45) Date of Patent: May 26, 2020

(54) AUDIO/VIDEO RECORDING AND COMMUNICATION DEVICES FOR FLUSH MOUNTING WITHIN A JUNCTION BOX

(71) Applicant: Ring Inc., Santa Monica, CA (US)

(72) Inventors: James Siminoff, Pacific Palisades, CA (US); Spiro Sacre, Los Angeles, CA (US)

(73) Assignee: Amazon Technologies, Inc., Seattle, WA (US)

(*) Notice: Subject to any disclaimer, the term of this patent is extended or adjusted under 35 U.S.C. 154(b) by 0 days.

(21) Appl. No.: 15/696,097

(22) Filed: Sep. 5, 2017

(65) Prior Publication Data
US 2018/0077391 A1 Mar. 15, 2018

Related U.S. Application Data

(60) Provisional application No. 62/394,612, filed on Sep. 14, 2016.

(51) Int. Cl.
G08B 3/10 (2006.01)
H04N 7/18 (2006.01)
(Continued)

(52) U.S. Cl.
CPC .............. H04N 7/186 (2013.01); G08B 3/10 (2013.01); G08B 13/19619 (2013.01);
(Continued)

(58) Field of Classification Search
CPC .... H04N 7/186; H04N 5/2252; H04N 5/2256; H04N 5/232; G08B 3/10; G08B 13/19619; H02G 3/12; H02G 3/081; H04B 1/3888
See application file for complete search history.

(56) References Cited

U.S. PATENT DOCUMENTS 4,764,953 A  8/1988  Chern et al.
5,428,388 A  6/1995  von Bauer et al.
(Continued)

FOREIGN PATENT DOCUMENTS

CN  2585521 Y  11/2003
CN  2792061 Y  6/2006
(Continued)

OTHER PUBLICATIONS

Kim, Sung Gon, International Search Report and Written Opinion of the International Searching Authority for PCT/US/2017/050145, dated Dec. 14, 2017, International Application Division, Korean Intellectual Property Office, Republic of Korea.

Primary Examiner — Dramos Kalapodas
(74) Attorney, Agent, or Firm — Lathrop GPM LLP

(57) ABSTRACT

Audio/video (A/V) recording and communication devices for flush mounting within a junction box in accordance with various embodiments of the present disclosure are provided. In one embodiment, an A/V recording and communication device is provided, comprising a housing defining an enclosure having a front opening, the housing having a rearward portion configured to fit within a single-gang junction box, a camera located at least partially within the enclosure, the camera having a field of view extending outwardly of the front opening of the enclosure, a speaker located at least partially within the enclosure adjacent the front opening, a microphone located at least partially within the enclosure adjacent the front opening, and a front button located at least partially within the enclosure and protruding outwardly from the front opening.

28 Claims, 22 Drawing Sheets

(51) Int. Cl.
*H02G 3/12* (2006.01)
*G08B 13/196* (2006.01)
*H02G 3/08* (2006.01)
*H04N 5/225* (2006.01)

(52) U.S. Cl.
CPC .............. *H02G 3/081* (2013.01); *H02G 3/12* (2013.01); *H04N 5/2252* (2013.01); *H04N 5/2256* (2013.01)

(56) References Cited

U.S. PATENT DOCUMENTS

| | | |
|---|---|---|
| 5,760,848 A | 6/1998 | Cho |
| 6,072,402 A | 6/2000 | Kniffin et al. |
| 6,192,257 B1 | 2/2001 | Ray |
| 6,271,752 B1 | 8/2001 | Vaios |
| 6,429,893 B1 | 8/2002 | Xin |
| 6,456,322 B1 | 9/2002 | Marinacci |
| 6,476,858 B1 | 11/2002 | Ramirez Diaz et al. |
| 6,633,231 B1 | 10/2003 | Okamoto et al. |
| 6,658,091 B1 | 12/2003 | Naidoo et al. |
| 6,753,774 B2 | 6/2004 | Pan et al. |
| 6,970,183 B1 | 11/2005 | Monroe |
| 7,062,291 B2 | 6/2006 | Ryley et al. |
| 7,065,196 B2 | 6/2006 | Lee |
| 7,085,361 B2 | 8/2006 | Thomas |
| 7,109,860 B2 | 9/2006 | Wang |
| 7,193,644 B2 | 3/2007 | Carter |
| 7,304,572 B2 | 12/2007 | Sheynman et al. |
| 7,382,249 B2 | 6/2008 | Fancella |
| 7,450,638 B2 | 11/2008 | Iwamura |
| 7,643,056 B2 | 1/2010 | Silsby |
| 7,683,924 B2 | 3/2010 | Oh et al. |
| 7,683,929 B2 | 3/2010 | Elazar et al. |
| 7,738,917 B2 | 6/2010 | Ryley et al. |
| 8,139,098 B2 | 3/2012 | Carter |
| 8,144,183 B2 | 3/2012 | Carter |
| 8,154,581 B2 | 4/2012 | Carter |
| 8,619,136 B2 | 12/2013 | Howarter et al. |
| 8,872,915 B1 | 5/2014 | Scalisi et al. |
| 8,780,201 B1 | 7/2014 | Scalisi et al. |
| 8,823,795 B1 | 9/2014 | Scalisi et al. |
| 8,842,180 B1 | 9/2014 | Kasmir et al. |
| 8,937,659 B1 | 1/2015 | Scalisi et al. |
| 8,941,736 B1 | 1/2015 | Scalisi |
| 8,947,530 B1 | 2/2015 | Scalisi |
| 8,953,040 B1 | 2/2015 | Scalisi et al. |
| 9,013,575 B2 | 4/2015 | Scalisi |
| 9,049,352 B2 | 6/2015 | Scalisi et al. |
| 9,053,622 B2 | 6/2015 | Scalisi |
| 9,058,738 B1 | 6/2015 | Scalisi |
| 9,060,103 B2 | 6/2015 | Scalisi |
| 9,060,104 B2 | 6/2015 | Scalisi |
| 9,065,987 B2 | 6/2015 | Scalisi |
| 9,094,584 B2 | 7/2015 | Scalisi et al. |
| 9,113,051 B1 | 8/2015 | Scalisi |
| 9,113,052 B1 | 8/2015 | Scalisi et al. |
| 9,118,819 B1 | 8/2015 | Scalisi et al. |
| 9,142,214 B2 | 9/2015 | Scalisi |
| 9,160,987 B1 | 10/2015 | Kasmir et al. |
| 9,165,444 B2 | 10/2015 | Scalisi |
| 9,172,920 B1 | 10/2015 | Kasmir et al. |
| 9,172,921 B1 | 10/2015 | Scalisi et al. |
| 9,172,922 B1 | 10/2015 | Kasmir et al. |
| 9,179,107 B1 | 11/2015 | Scalisi |
| 9,179,108 B1 | 11/2015 | Scalisi |
| 9,179,109 B1 | 11/2015 | Kasmir et al. |
| 9,196,133 B2 | 11/2015 | Scalisi et al. |
| 9,197,867 B1 | 11/2015 | Scalisi et al. |
| 9,230,424 B1 | 1/2016 | Scalisi et al. |
| 9,237,318 B2 | 1/2016 | Kasmir et al. |
| 9,247,219 B2 | 1/2016 | Kasmir et al. |
| 9,253,455 B1 | 2/2016 | Harrison et al. |
| 9,342,936 B2 | 5/2016 | Scalisi |
| 9,508,239 B1 | 11/2016 | Harrison et al. |
| 9,736,284 B2 | 8/2017 | Scalisi et al. |
| 9,743,049 B2 | 8/2017 | Scalisi et al. |
| 9,769,435 B2 | 9/2017 | Scalisi et al. |
| 9,786,133 B2 | 10/2017 | Harrison et al. |
| 9,799,183 B2 | 10/2017 | Harrison et al. |
| 9,979,427 B2 * | 5/2018 | Thomas .............. H05K 9/0069 |
| 2002/0094111 A1 | 7/2002 | Puchek et al. |
| 2002/0147982 A1 | 10/2002 | Naidoo et al. |
| 2003/0043047 A1 | 3/2003 | Braun |
| 2004/0085205 A1 | 5/2004 | Yeh |
| 2004/0085450 A1 | 5/2004 | Stuart |
| 2004/0086093 A1 | 5/2004 | Schranz |
| 2004/0095254 A1 | 5/2004 | Maruszczak |
| 2004/0135686 A1 | 7/2004 | Parker |
| 2004/0267385 A1 * | 12/2004 | Lingemann ............ G05B 15/02 700/83 |
| 2005/0111660 A1 | 5/2005 | Hosoda |
| 2006/0010199 A1 | 1/2006 | Brailean et al. |
| 2006/0022816 A1 | 2/2006 | Yukawa |
| 2006/0139449 A1 | 6/2006 | Cheng et al. |
| 2006/0156361 A1 | 7/2006 | Wang et al. |
| 2007/0008081 A1 | 1/2007 | Tylicki et al. |
| 2008/0170130 A1 * | 7/2008 | Ollila e ................ H04N 5/2252 348/211.99 |
| 2009/0072988 A1 | 3/2009 | Haywood |
| 2010/0225455 A1 | 9/2010 | Claiborne et al. |
| 2013/0057695 A1 | 3/2013 | Huisking |
| 2014/0267716 A1 | 9/2014 | Child et al. |
| 2015/0029335 A1 | 1/2015 | Kasmir et al. |
| 2015/0070181 A1 * | 3/2015 | Fadell .................... G08B 21/22 340/628 |
| 2015/0163463 A1 | 6/2015 | Hwang et al. |
| 2015/0228419 A1 * | 8/2015 | Fadell .................... G08B 17/00 307/112 |
| 2016/0044217 A1 * | 2/2016 | Richardson .......... H04N 5/2256 348/207.11 |
| 2016/0191864 A1 | 6/2016 | Siminoff et al. |
| 2017/0198235 A1 * | 7/2017 | Kusumoto ........... C10M 139/00 |
| 2017/0198236 A1 * | 7/2017 | Hiyoshi ............... C10M 169/04 |
| 2017/0238401 A1 * | 8/2017 | Sadwick ................ A61N 5/01 315/294 |
| 2018/0332204 A1 * | 11/2018 | Chien .................. H04N 5/2257 |

FOREIGN PATENT DOCUMENTS

| | | |
|---|---|---|
| EP | 0944883 A1 | 6/1998 |
| EP | 1480462 A1 | 11/2004 |
| GB | 2286283 A | 8/1995 |
| GB | 2354394 A | 3/2001 |
| GB | 2357387 A | 6/2001 |
| GB | 2400958 A | 10/2004 |
| JP | 2001-103463 A | 4/2001 |
| JP | 2002-033839 A | 1/2002 |
| JP | 2002-125059 A | 4/2002 |
| JP | 2002-342863 A | 11/2002 |
| JP | 2002-344640 A | 11/2002 |
| JP | 2002-354137 A | 12/2002 |
| JP | 2002-368890 A | 12/2002 |
| JP | 2003-283696 A | 10/2003 |
| JP | 2004-128835 A | 4/2004 |
| JP | 2005-341040 A | 12/2005 |
| JP | 2006-147650 A | 6/2006 |
| JP | 2006-262342 A | 9/2006 |
| JP | 2009-008925 A | 1/2009 |
| JP | 2013-009239 A | 1/2013 |
| KR | 10-1602822 B1 | 3/2016 |
| WO | 1998/39894 A1 | 9/1998 |
| WO | 2001/13638 A1 | 2/2001 |
| WO | 2001/93220 A1 | 12/2001 |
| WO | 2002/085019 A1 | 10/2002 |
| WO | 2003/028375 A1 | 4/2003 |
| WO | 2003/096696 A1 | 11/2003 |
| WO | 2006/038760 A1 | 4/2006 |
| WO | 2006/067782 A1 | 6/2006 |
| WO | 2007/125143 A1 | 8/2007 |

* cited by examiner

AUDIO/VIDEO RECORDING AND COMMUNICATION DEVICES FOR FLUSH MOUNTING WITHIN A JUNCTION BOX

CROSS-REFERENCE TO RELATED APPLICATION

This application claims priority to provisional application Ser. No. 62/394,612, filed on Sep. 14, 2016, the entire contents of which are hereby incorporated by reference.

TECHNICAL FIELD

The present embodiments relate to audio/video (A/V) recording and communication devices, including A/V recording and communication doorbell systems. In particular, the present embodiments relate to improvements in the functionality of A/V recording and communication devices that strengthen the ability of such devices to reduce crime and enhance public safety.

BACKGROUND

Home security is a concern for many homeowners and renters. Those seeking to protect or monitor their homes often wish to have video and audio communications with visitors, for example, those visiting an external door or entryway. Audio/Video (A/V) recording and communication devices, such as doorbells, provide this functionality, and can also aid in crime detection and prevention. For example, audio and/or video captured by an A/V recording and communication device can be uploaded to the cloud and recorded on a remote server. Subsequent review of the A/V footage can aid law enforcement in capturing perpetrators of home burglaries and other crimes. Further, the presence of one or more A/V recording and communication devices on the exterior of a home, such as a doorbell unit at the entrance to the home, acts as a powerful deterrent against would-be burglars.

SUMMARY

The various embodiments of the present audio/video recording and communication devices for flush mounting within a junction box have several features, no single one of which is solely responsible for their desirable attributes. Without limiting the scope of the present embodiments as expressed by the claims that follow, their more prominent features now will be discussed briefly. After considering this discussion, and particularly after reading the section entitled "Detailed Description," one will understand how the features of the present embodiments provide the advantages described herein.

In a first aspect, an audio/video (A/V) recording and communication device is provided, the device comprising a housing defining an enclosure having a front opening, the housing having a rearward portion configured to fit within a three-dimensional space having a height of about 94.37 mm, a width of about 47.59 mm, and a depth of about 40.20 mm, a camera located at least partially within the enclosure, the camera having a field of view extending outwardly of the front opening of the enclosure, a speaker located at least partially within the enclosure adjacent the front opening, a microphone located at least partially within the enclosure adjacent the front opening, and a front button located at least partially within the enclosure and protruding outwardly from the front opening.

In an embodiment of the first aspect, the housing further comprises a forward lip portion extending around the front opening.

In another embodiment of the first aspect, the forward lip portion comprises perimeter dimensions that create an interference fit with a single-gang junction box.

In another embodiment of the first aspect, the forward lip portion has a height of about 96.62 mm and a width of about 50.62 mm.

In another embodiment of the first aspect, the A/V recording and communication device comprises a doorbell.

Another embodiment of the first aspect further comprises a shield positioned forward of the front opening of the enclosure.

In another embodiment of the first aspect, the shield includes an upper opening adjacent the camera.

In another embodiment of the first aspect, the shield includes a lower opening encircling the front button, the lower opening being located below the upper opening.

In another embodiment of the first aspect, the shield includes a central opening located between the upper opening and the lower opening.

Another embodiment of the first aspect further comprises a front face plate at least partially overlying the front opening of the enclosure.

In another embodiment of the first aspect, the front face plate has a height greater than the height of the housing and a width greater than the width of the housing.

Another embodiment of the first aspect further comprises a shell overlying the front face plate.

In another embodiment of the first aspect, the shell includes a central opening.

In another embodiment of the first aspect, the central opening in the shell is sized and shaped to accommodate the shield.

In another embodiment of the first aspect, the shield resides within the central opening in the shell such that a front surface of the shield is substantially flush with a front surface of the shell and there is little or no gap between outer edges of the shield and inner edges of the central opening in the shell.

Another embodiment of the first aspect further comprises an infrared (IR) light source located at least partially within the enclosure adjacent the front opening.

In another embodiment of the first aspect, the IR light source comprises at least one IR LED (light-emitting diode).

In another embodiment of the first aspect, the IR light source comprises a first IR LED and a second IR LED located on opposite sides of the front button.

Another embodiment of the first aspect further comprises a motion sensor.

In another embodiment of the first aspect, the motion sensor is located behind the front button.

In another embodiment of the first aspect, the front button comprises a Fresnel lens patterned to direct incoming light into the motion sensor located behind the front button.

Another embodiment of the first aspect further comprises a communication module.

In another embodiment of the first aspect, the camera is located above the front button.

In another embodiment of the first aspect, the speaker is located below the front button.

In another embodiment of the first aspect, the housing further comprises an upper channel and a lower channel configured to accommodate tabs on a junction box to facilitate inserting the A/V recording and communication device into the junction box through a front opening of the junction box.

In a second aspect, an audio/video (A/V) recording and communication device is provided, the device comprising a housing defining an enclosure having a front opening, the housing having a rearward portion configured to fit within a three-dimensional space having a height of about 76 mm, a width of about 49 mm, and a depth of about 40 mm, a camera located at least partially within the enclosure, the camera having a field of view extending outwardly of the front opening of the enclosure, a speaker located at least partially within the enclosure adjacent the front opening, a microphone located at least partially within the enclosure adjacent the front opening, and a front button located at least partially within the enclosure and protruding outwardly from the front opening.

In an embodiment of the second aspect, the housing further comprises a forward lip portion extending around the front opening.

In another embodiment of the second aspect, the forward lip portion comprises perimeter dimensions that create an interference fit with a single-gang junction box.

In another embodiment of the second aspect, the forward lip portion has a height of about 96.62 mm and a width of about 50.62 mm.

In another embodiment of the second aspect, the A/V recording and communication device comprises a doorbell.

Another embodiment of the second aspect further comprises a shield positioned forward of the front opening of the enclosure.

In another embodiment of the second aspect, the shield includes an upper opening adjacent the camera.

In another embodiment of the second aspect, the shield includes a lower opening encircling the front button, the lower opening being located below the upper opening.

In another embodiment of the second aspect, the shield includes a central opening located between the upper opening and the lower opening.

Another embodiment of the second aspect further comprises a front face plate at least partially overlying the front opening of the enclosure.

In another embodiment of the second aspect, the front face plate has a height greater than the height of the housing and a width greater than the width of the housing.

Another embodiment of the second aspect further comprises a shell overlying the front face plate.

In another embodiment of the second aspect, the shell includes a central opening.

In another embodiment of the second aspect, the central opening in the shell is sized and shaped to accommodate the shield.

In another embodiment of the second aspect, the shield resides within the central opening in the shell such that a front surface of the shield is substantially flush with a front surface of the shell and there is little or no gap between outer edges of the shield and inner edges of the central opening in the shell.

Another embodiment of the second aspect further comprises an infrared (IR) light source located at least partially within the enclosure adjacent the front opening.

In another embodiment of the second aspect, the IR light source comprises at least one IR LED (light-emitting diode).

In another embodiment of the second aspect, the IR light source comprises a first IR LED and a second IR LED located on opposite sides of the front button.

Another embodiment of the second aspect further comprises a motion sensor.

In another embodiment of the second aspect, the motion sensor is located behind the front button.

In another embodiment of the second aspect, the front button comprises a Fresnel lens patterned to direct incoming light into the motion sensor located behind the front button.

Another embodiment of the second aspect further comprises a communication module.

In another embodiment of the second aspect, the camera is located above the front button.

In another embodiment of the second aspect, the speaker is located below the front button.

In another embodiment of the second aspect, the housing further comprises an upper channel and a lower channel configured to accommodate tabs on a junction box to facilitate inserting the A/V recording and communication device into the junction box through a front opening of the junction box.

In a third aspect, an audio/video (A/V) recording and communication device is provided, the device comprising a housing defining an enclosure having a front opening, the housing having a rearward portion having a height of about 93.49 mm, a width of about 47.49 mm, and a depth of about 36.20 mm, a camera located at least partially within the enclosure, the camera having a field of view extending outwardly of the front opening of the enclosure, a speaker located at least partially within the enclosure adjacent the front opening, a microphone located at least partially within the enclosure adjacent the front opening, and a front button located at least partially within the enclosure and protruding outwardly from the front opening.

In an embodiment of the third aspect, the housing further comprises a forward lip portion extending around the front opening.

In another embodiment of the third aspect, the forward lip portion comprises perimeter dimensions that create an interference fit with a single-gang junction box.

In another embodiment of the third aspect, the forward lip portion has a height of about 96.62 mm and a width of about 50.62 mm.

In another embodiment of the third aspect, the A/V recording and communication device comprises a doorbell.

Another embodiment of the third aspect further comprises a shield positioned forward of the front opening of the enclosure.

In another embodiment of the third aspect, the shield includes an upper opening adjacent the camera.

In another embodiment of the third aspect, the shield includes a lower opening encircling the front button, the lower opening being located below the upper opening.

In another embodiment of the third aspect, the shield includes a central opening located between the upper opening and the lower opening.

Another embodiment of the third aspect further comprises a front face plate at least partially overlying the front opening of the enclosure.

In another embodiment of the third aspect, the front face plate has a height greater than the height of the housing and a width greater than the width of the housing.

Another embodiment of the third aspect further comprises a shell overlying the front face plate.

In another embodiment of the third aspect, the shell includes a central opening.

In another embodiment of the third aspect, the central opening in the shell is sized and shaped to accommodate the shield.

In another embodiment of the third aspect, the shield resides within the central opening in the shell such that a front surface of the shield is substantially flush with a front surface of the shell and there is little or no gap between outer edges of the shield and inner edges of the central opening in the shell.

Another embodiment of the third aspect further comprises an infrared (IR) light source located at least partially within the enclosure adjacent the front opening.

In another embodiment of the third aspect, the IR light source comprises at least one IR LED (light-emitting diode).

In another embodiment of the third aspect, the IR light source comprises a first IR LED and a second IR LED located on opposite sides of the front button.

Another embodiment of the third aspect further comprises a motion sensor.

In another embodiment of the third aspect, the motion sensor is located behind the front button.

In another embodiment of the third aspect, the front button comprises a Fresnel lens patterned to direct incoming light into the motion sensor located behind the front button.

Another embodiment of the third aspect further comprises a communication module.

In another embodiment of the third aspect, the camera is located above the front button.

In another embodiment of the third aspect, the speaker is located below the front button.

In another embodiment of the third aspect, the housing further comprises an upper channel and a lower channel configured to accommodate tabs on a junction box to facilitate inserting the A/V recording and communication device into the junction box through a front opening of the junction box.

In a fourth aspect, an audio/video (A/V) recording and communication device is provided, the device comprising a housing defining an enclosure having a front opening, the housing having a rearward portion configured to fit within a single-gang junction box, a camera located at least partially within the enclosure, the camera having a field of view extending outwardly of the front opening of the enclosure, a speaker located at least partially within the enclosure adjacent the front opening, a microphone located at least partially within the enclosure adjacent the front opening, and a front button located at least partially within the enclosure and protruding outwardly from the front opening.

In an embodiment of the fourth aspect, the housing further comprises a forward lip portion extending around the front opening.

In another embodiment of the fourth aspect, the forward lip portion comprises perimeter dimensions that create an interference fit with the junction box.

In another embodiment of the fourth aspect, the forward lip portion has a height of about 96.62 mm and a width of about 50.62 mm.

In another embodiment of the fourth aspect, the A/V recording and communication device comprises a doorbell.

Another embodiment of the fourth aspect further comprises a shield positioned forward of the front opening of the enclosure.

In another embodiment of the fourth aspect, the shield includes an upper opening adjacent the camera.

In another embodiment of the fourth aspect, the shield includes a lower opening encircling the front button, the lower opening being located below the upper opening.

In another embodiment of the fourth aspect, the shield includes a central opening located between the upper opening and the lower opening.

Another embodiment of the fourth aspect further comprises a front face plate at least partially overlying the front opening of the enclosure.

In another embodiment of the fourth aspect, the front face plate has a height greater than the height of the housing and a width greater than the width of the housing.

Another embodiment of the fourth aspect further comprises a shell overlying the front face plate.

In another embodiment of the fourth aspect, the shell includes a central opening.

In another embodiment of the fourth aspect, the central opening in the shell is sized and shaped to accommodate the shield.

In another embodiment of the fourth aspect, the shield resides within the central opening in the shell such that a front surface of the shield is substantially flush with a front surface of the shell and there is little or no gap between outer edges of the shield and inner edges of the central opening in the shell.

Another embodiment of the fourth aspect further comprises an infrared (IR) light source located at least partially within the enclosure adjacent the front opening.

In another embodiment of the fourth aspect, the IR light source comprises at least one IR LED (light-emitting diode).

In another embodiment of the fourth aspect, the IR light source comprises a first IR LED and a second IR LED located on opposite sides of the front button.

Another embodiment of the fourth aspect further comprises a motion sensor.

In another embodiment of the fourth aspect, the motion sensor is located behind the front button.

In another embodiment of the fourth aspect, the front button comprises a Fresnel lens patterned to direct incoming light into the motion sensor located behind the front button.

Another embodiment of the fourth aspect further comprises a communication module.

In another embodiment of the fourth aspect, the camera is located above the front button.

In another embodiment of the fourth aspect, the speaker is located below the front button.

In another embodiment of the fourth aspect, the housing further comprises an upper channel and a lower channel configured to accommodate tabs on the junction box to facilitate inserting the A/V recording and communication device into the junction box through a front opening of the junction box.

In another embodiment of the fourth aspect, the junction box comprises a three-dimensional interior space having a height of about 94.37 mm, a width of about 47.59 mm, and a depth of about 40.20 mm.

In another embodiment of the fourth aspect, the junction box comprises a three-dimensional interior space having a height of about 76 mm, a width of about 49 mm, and a depth of about 40 mm.

In another embodiment of the fourth aspect, the rearward portion of the housing has a height of about 93.49 mm, a width of about 47.49 mm, and a depth of about 36.20 mm.

BRIEF DESCRIPTION OF THE DRAWINGS

The various embodiments of the present audio/video recording and communication devices for flush mounting within a junction box now will be discussed in detail with an emphasis on highlighting the advantageous features. These embodiments depict the novel and non-obvious audio/video recording and communication devices for flush mounting within a junction box shown in the accompanying drawings, which are for illustrative purposes only. These drawings include the following figures, in which like numerals indicate like parts.

DETAILED DESCRIPTION

Figure 1:
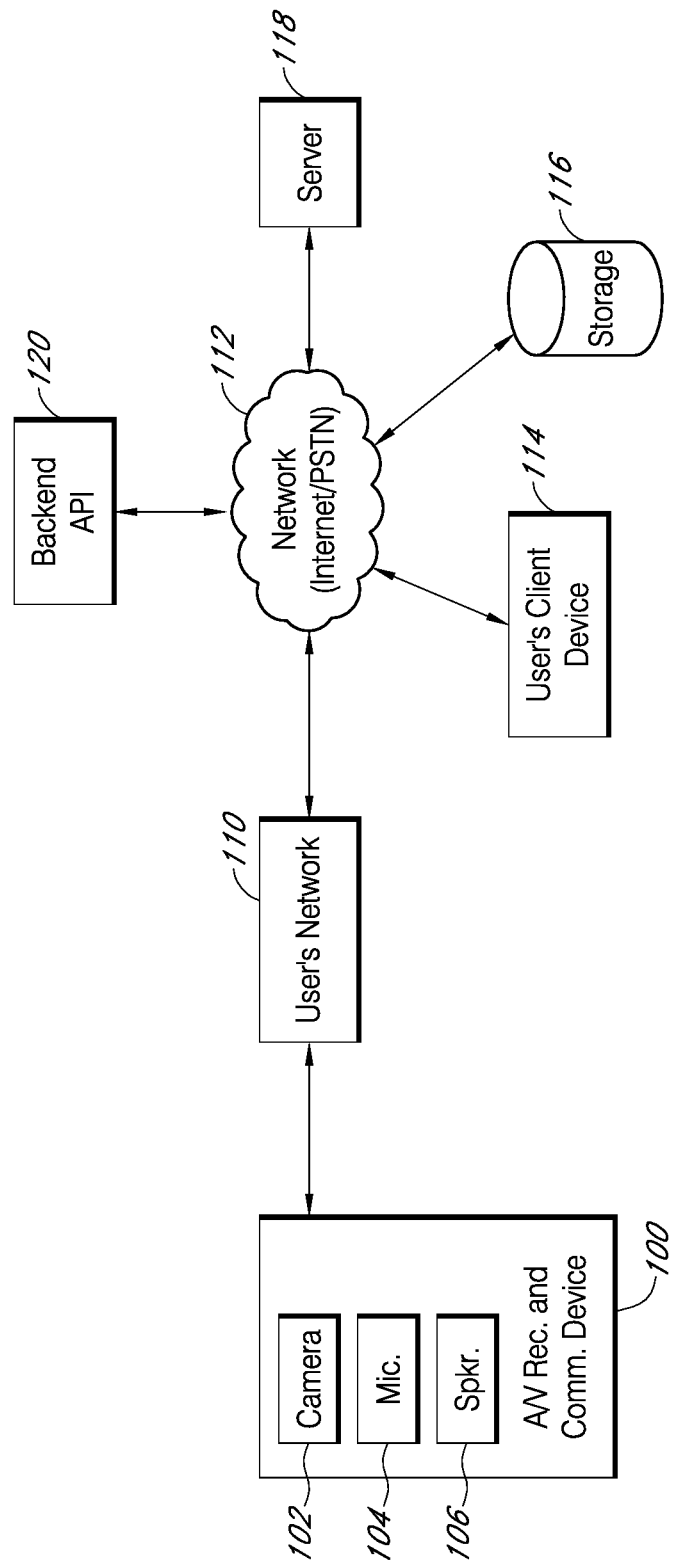
FIG. 1 is a functional block diagram illustrating a system for streaming and storing A/V content captured by an audio/video (A/V) recording and communication device according to various aspects of the present disclosure.

The following detailed description describes the present embodiments with reference to the drawings. In the drawings, reference numbers label elements of the present embodiments. These reference numbers are reproduced below in connection with the discussion of the corresponding drawing features.

The embodiments of the present audio/video recording and communication devices for flush mounting within a junction box are described below with reference to the figures. These figures, and their written descriptions, indicate that certain components of the apparatus are formed integrally, and certain other components are formed as separate pieces. Those of ordinary skill in the art will appreciate that components shown and described herein as being formed integrally may in alternative embodiments be formed as separate pieces. Those of ordinary skill in the art will further appreciate that components shown and described herein as being formed as separate pieces may in alternative embodiments be formed integrally. Further, as used herein the term integral describes a single unitary piece.

With reference to FIG. 1, the present embodiments include an audio/video (A/V) recording and communication device 100. While the present disclosure provides numerous examples of methods and systems including A/V recording and communication doorbells, the present embodiments are equally applicable for A/V recording and communication devices other than doorbells. For example, the present embodiments may include one or more A/V recording and communication security cameras instead of, or in addition to, one or more A/V recording and communication doorbells. An example A/V recording and communication security camera may include substantially all of the structure and/or functionality of the doorbells described herein, but without the front button and related components.

The A/V recording and communication device 100 may be located near the entrance to a structure (not shown), such as a dwelling, a business, a storage facility, etc. The A/V recording and communication device 100 includes a camera 102, a microphone 104, and a speaker 106. The camera 102 may comprise, for example, a high definition (HD) video camera, such as one capable of capturing video images at an image display resolution of 1080p or better. While not shown, the A/V recording and communication device 100 may also include other hardware and/or components, such as a housing, one or more motion sensors (and/or other types of sensors), a button, etc. The A/V recording and communication device 100 may further include similar componentry and/or functionality as the wireless communication doorbells described in US Patent Application Publication Nos. 2015/0022620 (application Ser. No. 14/499,828), 2015/0022618 (application Ser. No. 14/334,922), and/or U.S. patent application Ser. No. 62/308,746, filed on Mar. 15, 2016, all of which are incorporated herein by reference in their entireties as if fully set forth.

With further reference to FIG. 1, the A/V recording and communication device 100 communicates with a user's network 110, which may be for example a wired and/or wireless network. If the user's network 110 is wireless, or includes a wireless component, the network 110 may be a Wi-Fi network compatible with the IEEE 802.11 standard and/or other wireless communication standard(s). The user's network 110 is connected to another network 112, which may comprise, for example, the Internet and/or a public switched telephone network (PSTN). As described below, the A/V recording and communication device 100 may communicate with the user's client device 114 via the user's network 110 and the network 112 (Internet/PSTN). The user's client device 114 may comprise, for example, a mobile telephone (may also be referred to as a cellular telephone), such as a smartphone, a personal digital assistant (PDA), or another communication device. The user's client device 114 comprises a display (not shown) and related components capable of displaying streaming and/or recorded video images. The user's client device 114 may also comprise a speaker and related components capable of broadcasting streaming and/or recorded audio, and may also comprise a microphone. The A/V recording and communication device 100 may also communicate with one or more remote storage device(s) 116 (may be referred to interchangeably as "cloud storage device(s)"), one or more servers 118, and/or a backend API (application programming interface) 120 via the user's network 110 and the network 112 (Internet/PSTN). While FIG. 1 illustrates the storage device 116, the server 118, and the backend API 120 as components separate from the network 112, it is to be understood that the storage device 116, the server 118, and/or the backend API 120 may be considered to be components of the network 112.

The network 112 may be any wireless network or any wired network, or a combination thereof, configured to operatively couple the above mentioned modules, devices, and systems as shown in FIG. 1. For example, the network 112 may include one or more of the following: a PSTN (public switched telephone network), the Internet, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a DSL (Digital Subscriber Line) connection, an Ethernet connection, an ISDN (Integrated Services Digital Network) line, a dial-up port such as a V.90, V.34, or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), LTE, VoLTE, LoRaWAN, LPWAN, RPMA, LTE Cat-"X" (e.g. LTE Cat 1, LTE Cat 0, LTE CatM1, LTE Cat NB1), CDMA (Code Division Multiple Access), TDMA (Time Division Multiple Access), FDMA (Frequency Division Multiple Access), and/or OFDMA (Orthogonal Frequency Division Multiple Access) cellular phone networks, GPS, CDPD (cellular digital packet data), RIM (Research in Motion, Limited) duplex paging network, Bluetooth radio, or an IEEE 802.11-based radio frequency network. The network can further include or interface with any one or more of the following: RS-232 serial connection, IEEE-1394 (Firewire) connection, Fibre Channel connection, IrDA (infrared) port, SCSI (Small Computer Systems Interface) connection, USB (Universal Serial Bus) connection, or other wired or wireless, digital or analog, interface or connection, mesh or Digi® networking.

According to one or more aspects of the present embodiments, when a person (may be referred to interchangeably as "visitor") arrives at the A/V recording and communication device 100, the A/V recording and communication device 100 detects the visitor's presence and begins capturing video images within a field of view of the camera 102. The A/V communication device 100 may also capture audio through the microphone 104. The A/V recording and communication device 100 may detect the visitor's presence by detecting motion using the camera 102 and/or a motion sensor, and/or by detecting that the visitor has pressed a front button of the A/V recording and communication device 100 (if the A/V recording and communication device 100 is a doorbell).

In response to the detection of the visitor, the A/V recording and communication device 100 sends an alert to the user's client device 114 (FIG. 1) via the user's network 110 and the network 112. The A/V recording and communication device 100 also sends streaming video, and may also send streaming audio, to the user's client device 114. If the user answers the alert, two-way audio communication may then occur between the visitor and the user through the A/V recording and communication device 100 and the user's client device 114. The user may view the visitor throughout the duration of the call, but the visitor cannot see the user (unless the A/V recording and communication device 100 includes a display, which it may in some embodiments).

The video images captured by the camera 102 of the A/V recording and communication device 100 (and the audio captured by the microphone 104) may be uploaded to the cloud and recorded on the remote storage device 116 (FIG. 1). In some embodiments, the video and/or audio may be recorded on the remote storage device 116 even if the user chooses to ignore the alert sent to his or her client device 114.

With further reference to FIG. 1, the system may further comprise a backend API 120 including one or more components. A backend API (application programming interface) may comprise, for example, a server (e.g. a real server, or a virtual machine, or a machine running in a cloud infrastructure as a service), or multiple servers networked together, exposing at least one API to client(s) accessing it. These servers may include components such as application servers (e.g. software servers), depending upon what other components are included, such as a caching layer, or database layers, or other components. A backend API may, for example, comprise many such applications, each of which communicate with one another using their public APIs. In some embodiments, the API backend may hold the bulk of the user data and offer the user management capabilities, leaving the clients to have very limited state.

The backend API 120 illustrated FIG. 1 may include one or more APIs. An API is a set of routines, protocols, and tools for building software and applications. An API expresses a software component in terms of its operations, inputs, outputs, and underlying types, defining functionalities that are independent of their respective implementations, which allows definitions and implementations to vary without compromising the interface. Advantageously, an API may provide a programmer with access to an application's functionality without the programmer needing to modify the application itself, or even understand how the application works. An API may be for a web-based system, an operating system, or a database system, and it provides facilities to develop applications for that system using a given programming language. In addition to accessing databases or computer hardware like hard disk drives or video cards, an API can ease the work of programming GUI components. For example, an API can facilitate integration of new features into existing applications (a so-called "plug-in API"). An API can also assist otherwise distinct applications with sharing data, which can help to integrate and enhance the functionalities of the applications.

The backend API 120 illustrated in FIG. 1 may further include one or more services (also referred to as network services). A network service is an application that provides data storage, manipulation, presentation, communication, and/or other capability. Network services are often implemented using a client-server architecture based on application-layer network protocols. Each service may be provided by a server component running on one or more computers (such as a dedicated server computer offering multiple services) and accessed via a network by client components running on other devices. However, the client and server components can both be run on the same machine. Clients and servers may have a user interface, and sometimes other hardware associated with them.

Figure 2:
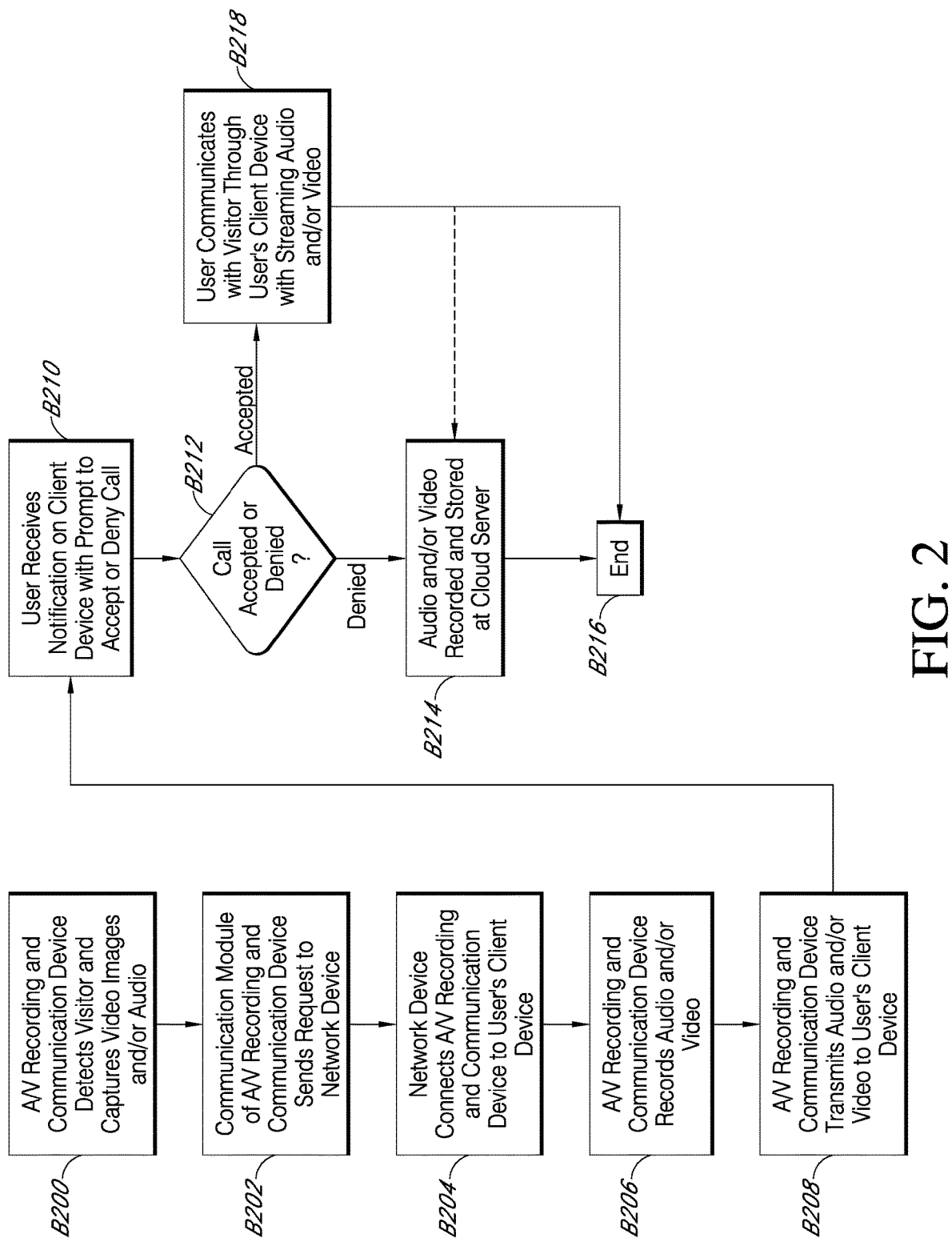
FIG. 2 is a flowchart illustrating a process for streaming and storing A/V content from an A/V recording and communication device according to various aspects of the present disclosure.

FIG. 2 is a flowchart illustrating a process for streaming and storing A/V content from the A/V recording and communication device 100 according to various aspects of the present disclosure. At block B200, the A/V recording and communication device 100 detects the visitor's presence and captures video images within a field of view of the camera 102. The A/V recording and communication device 100 may also capture audio through the microphone 104. As described above, the A/V recording and communication device 100 may detect the visitor's presence by detecting motion using the camera 102 and/or a motion sensor, and/or by detecting that the visitor has pressed a front button of the A/V recording and communication device 100 (if the A/V recording and communication device 100 is a doorbell). Also as described above, the video recording/capture may begin when the visitor is detected, or may begin earlier, as described below.

At block B202, a communication module of the A/V recording and communication device 100 sends a request, via the user's network 110 and the network 112, to a device in the network 112. For example, the network device to which the request is sent may be a server such as the server 118. The server 118 may comprise a computer program and/or a machine that waits for requests from other machines or software (clients) and responds to them. A server typically processes data. One purpose of a server is to share data and/or hardware and/or software resources among clients. This architecture is called the client-server model. The clients may run on the same computer or may connect to the server over a network. Examples of computing servers include database servers, file servers, mail servers, print servers, web servers, game servers, and application servers. The term server may be construed broadly to include any computerized process that shares a resource to one or more client processes. In another example, the network device to which the request is sent may be an API such as the backend API 120, which is described above.

In response to the request, at block B204 the network device may connect the A/V recording and communication device 100 to the user's client device 114 through the user's network 110 and the network 112. At block B206, the A/V recording and communication device 100 may record available audio and/or video data using the camera 102, the microphone 104, and/or any other device/sensor available. At block B208, the audio and/or video data is transmitted (streamed) from the A/V recording and communication device 100 to the user's client device 114 via the user's network 110 and the network 112. At block B210, the user may receive a notification on his or her client device 114 with a prompt to either accept or deny the call.

At block B212, the process determines whether the user has accepted or denied the call. If the user denies the notification, then the process advances to block B214, where the audio and/or video data is recorded and stored at a cloud server. The session then ends at block B216 and the connection between the A/V recording and communication device 100 and the user's client device 114 is terminated. If, however, the user accepts the notification, then at block B218 the user communicates with the visitor through the user's client device 114 while audio and/or video data captured by the camera 102, the microphone 104, and/or other devices/sensors is streamed to the user's client device 114. At the end of the call, the user may terminate the connection between the user's client device 114 and the A/V recording and communication device 100 and the session ends at block B216. In some embodiments, the audio and/or video data may be recorded and stored at a cloud server (block B214) even if the user accepts the notification and communicates with the visitor through the user's client device 114.

Figure 3:
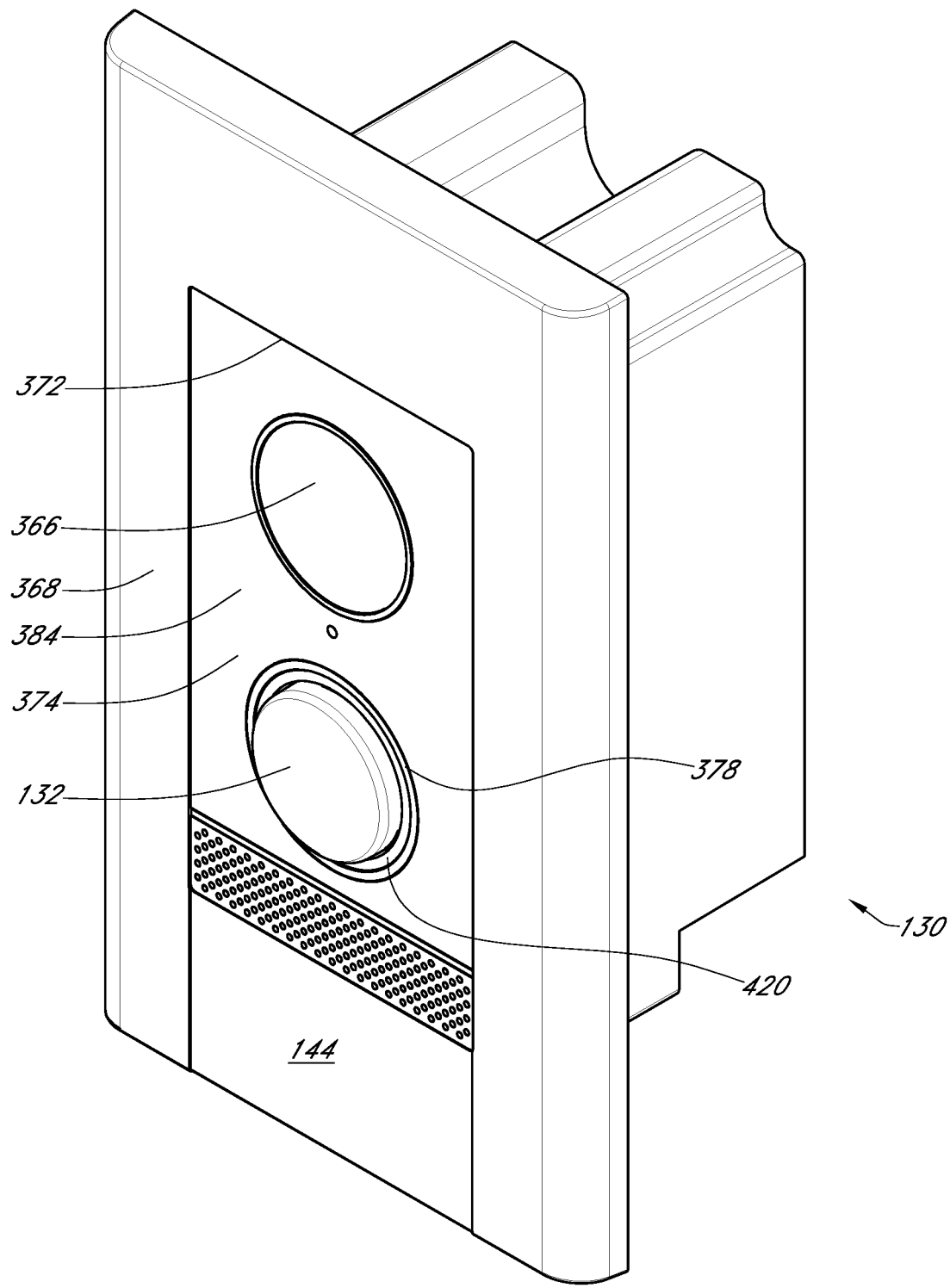
FIG. 3 is a front perspective view of an A/V recording and communication device for flush mounting within a junction box according to various aspects of the present disclosure.
Figure 4:
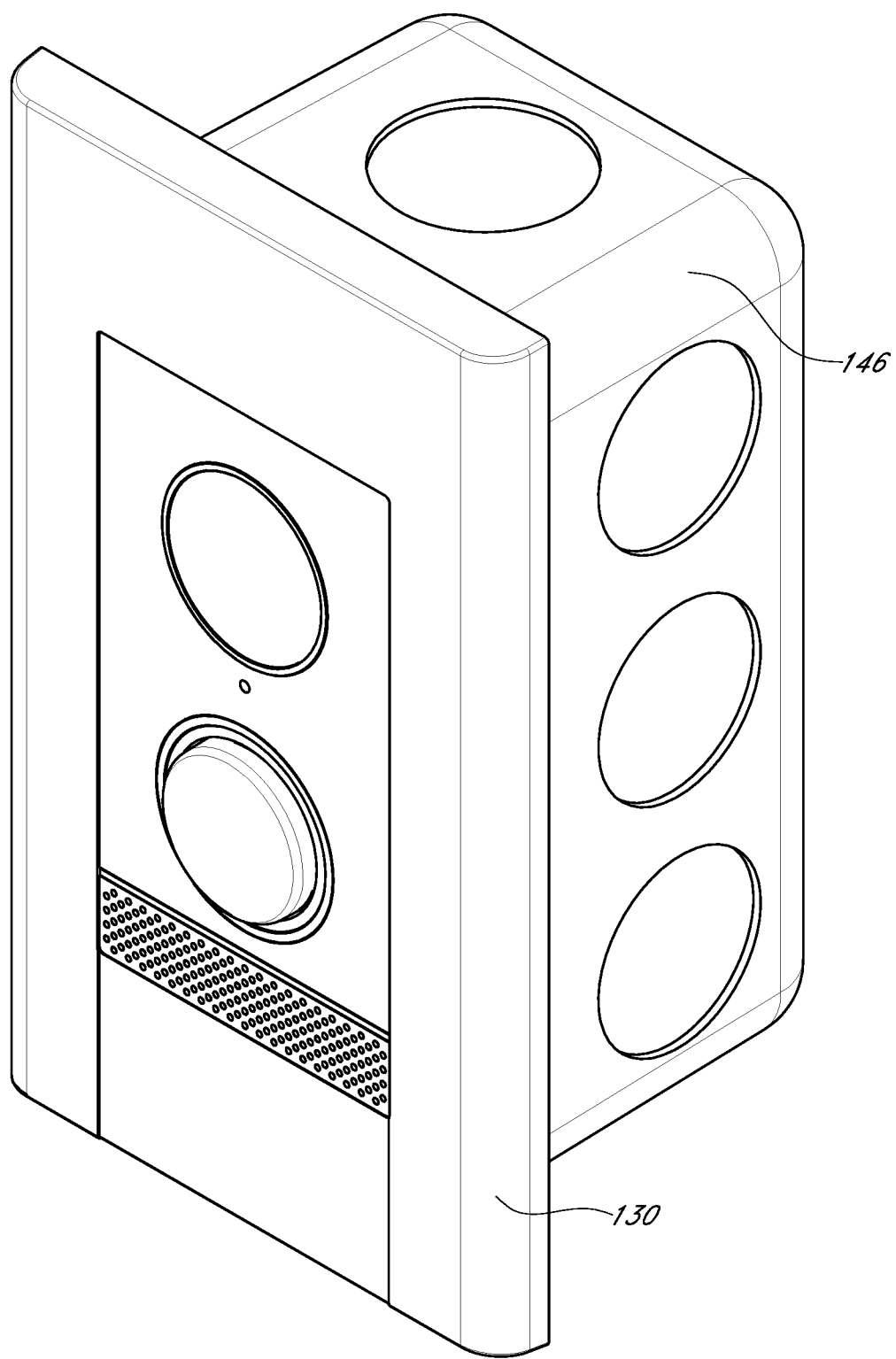
FIG. 4 is a front perspective view of the A/V recording and communication device of FIG. 3 engaged with a junction box.
Figure 5:
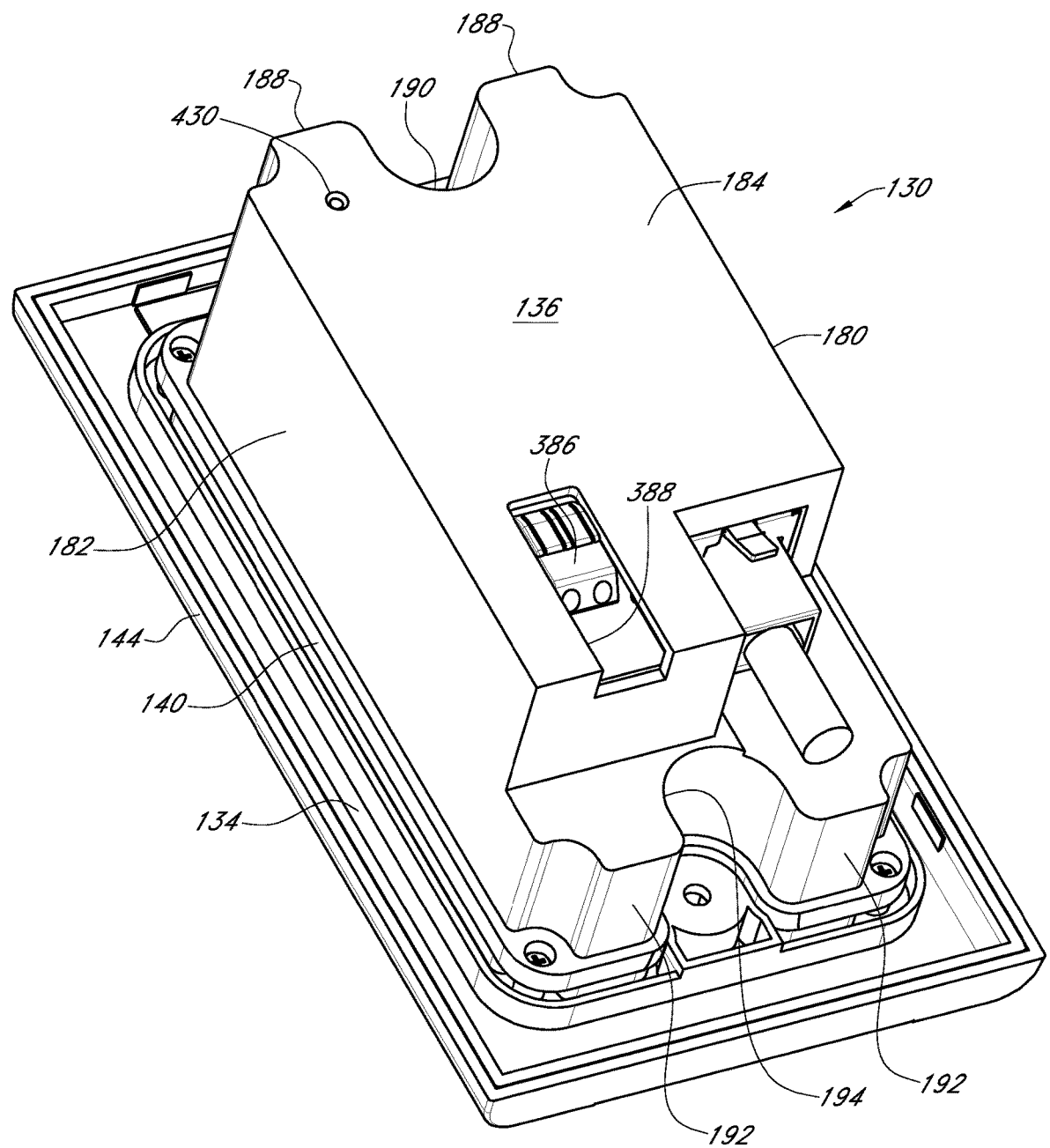
FIG. 5 is a rear perspective view of the A/V recording and communication device of FIG. 3.
Figure 8:
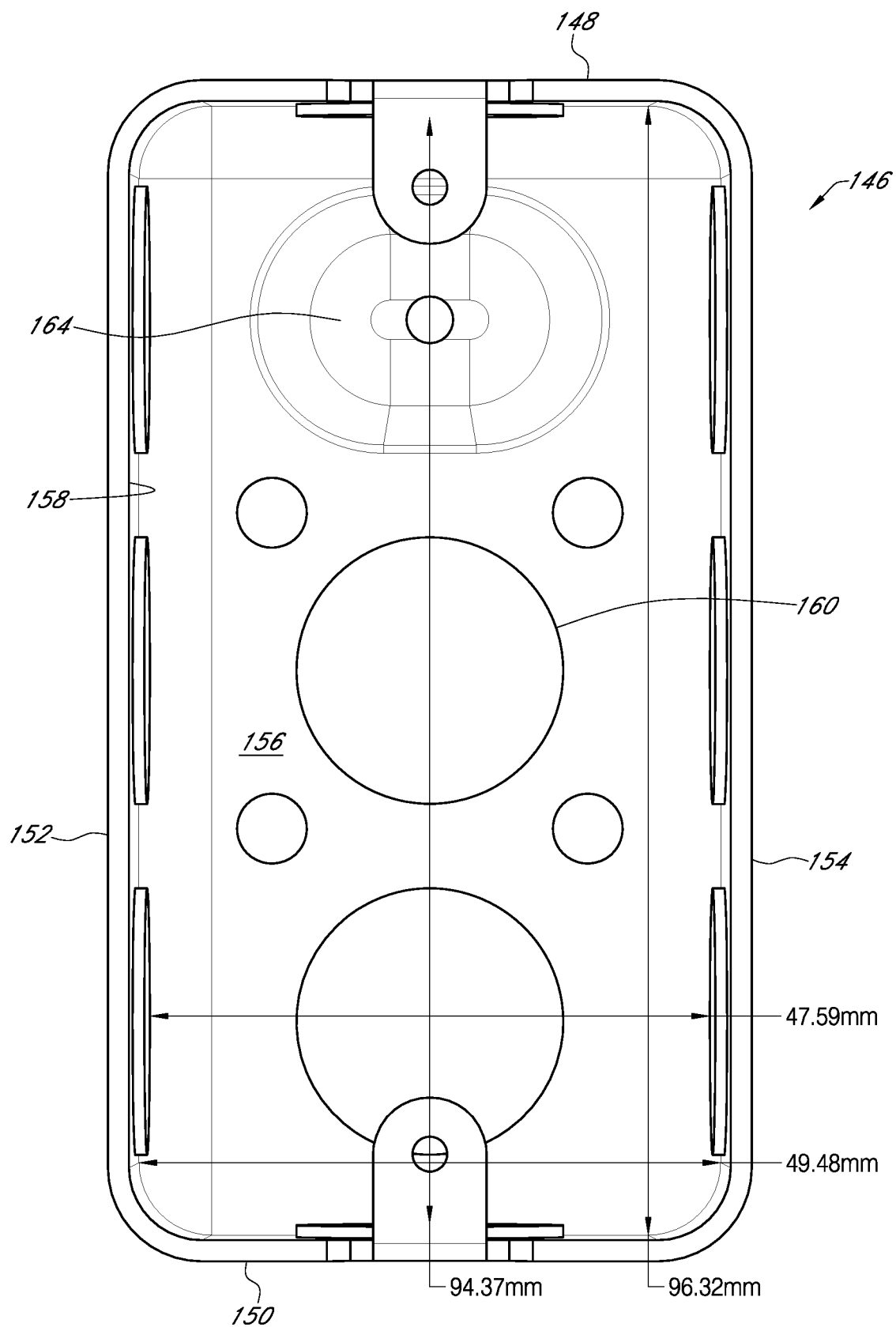
FIG. 8 is a front elevational view of the junction box of FIG. 7.
Figure 9:
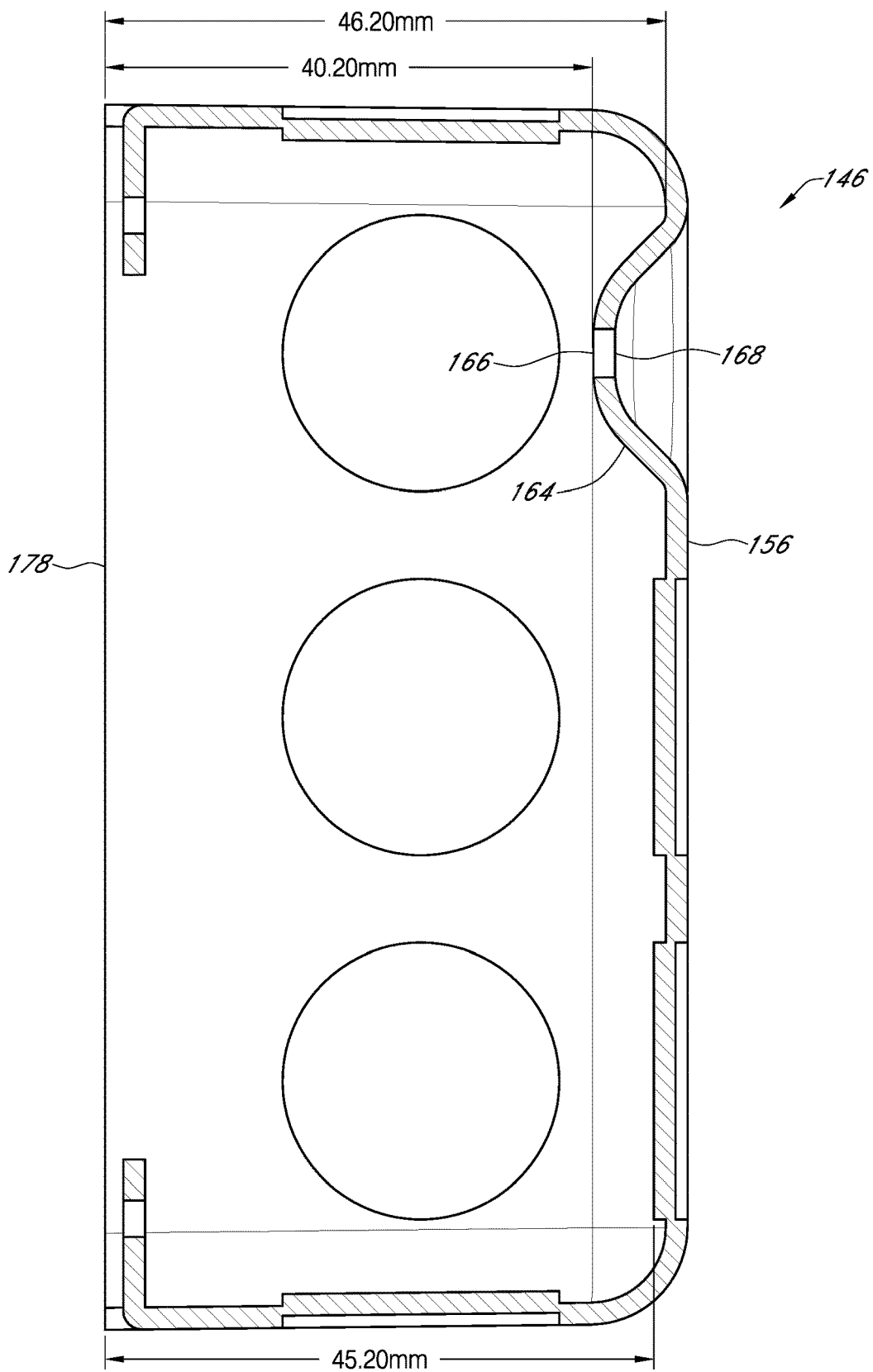
FIG. 9 is a right-side cross-sectional view of the junction box of FIG. 7 taken through the line 9-9 in FIG. 7.
Figure 10:
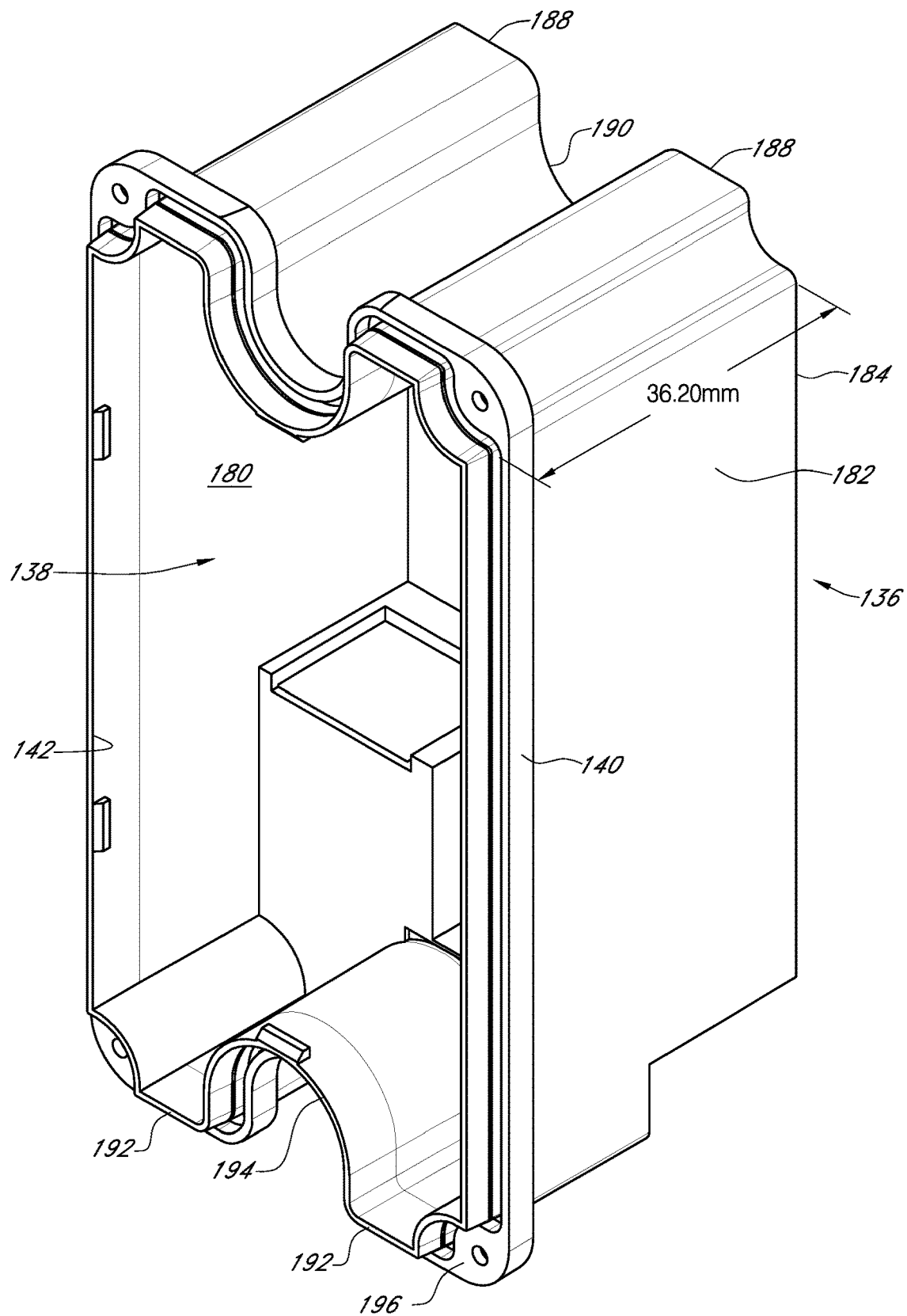
FIG. 10 is a front perspective view of a housing of the A/V recording and communication device of FIG. 3.

FIGS. 3-12 illustrate one embodiment of the present audio/video (A/V) recording and communication devices for flush mounting within a junction box according to various aspects of the present disclosure. The illustrated A/V recording and communication device 130 comprises a doorbell including a front button 132, but in alternative embodiments the A/V recording and communication device 130 may comprise another type of device, such as a security camera (which may not include a front button 132). With reference to FIGS. 3 and 5, which are front and rear perspective views, respectively, the A/V recording and communication device 130 includes a front face plate 134 (FIG. 5) and a housing 136 that extends rearward from the front face plate 134. With reference to FIGS. 5 and 10, the housing 136 defines an enclosure 138 and includes a forward lip portion 140 that extends radially outward at a front of the housing 136. The forward lip portion 140 extends around a front opening 142 (FIG. 10) of the housing 136. With reference to FIGS. 3 and 5, the A/V recording and communication device 130 further comprises a removable shell 144 that engages the front face plate 134. The removable shell 144 is described in further detail below with reference to FIG. 20.

Figure 6:
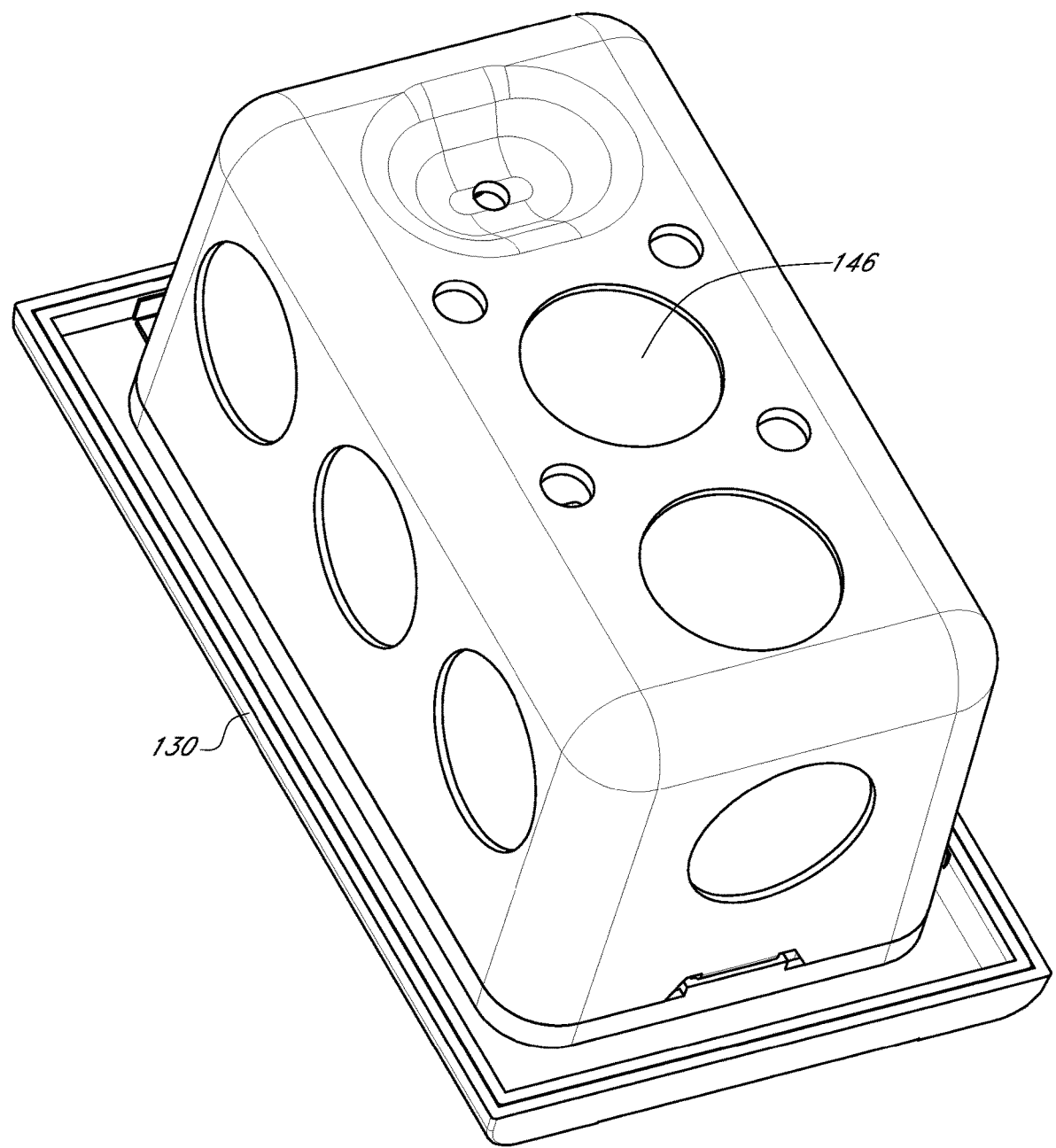
FIG. 6 is a rear perspective view of the A/V recording and communication device of FIG. 3 engaged with a junction box.

With reference to FIGS. 4 and 6, which are front and rear perspective views, respectively, the housing 136 is sized and configured to fit within a junction box 146. In particular, the housing 136 is sized and configured to fit within a standard-sized, single-gang junction box 146. Junction boxes are also commonly referred to as device boxes, and in the present disclosure the terms "junction box" and "device box" may be used interchangeably.

Figure 7:
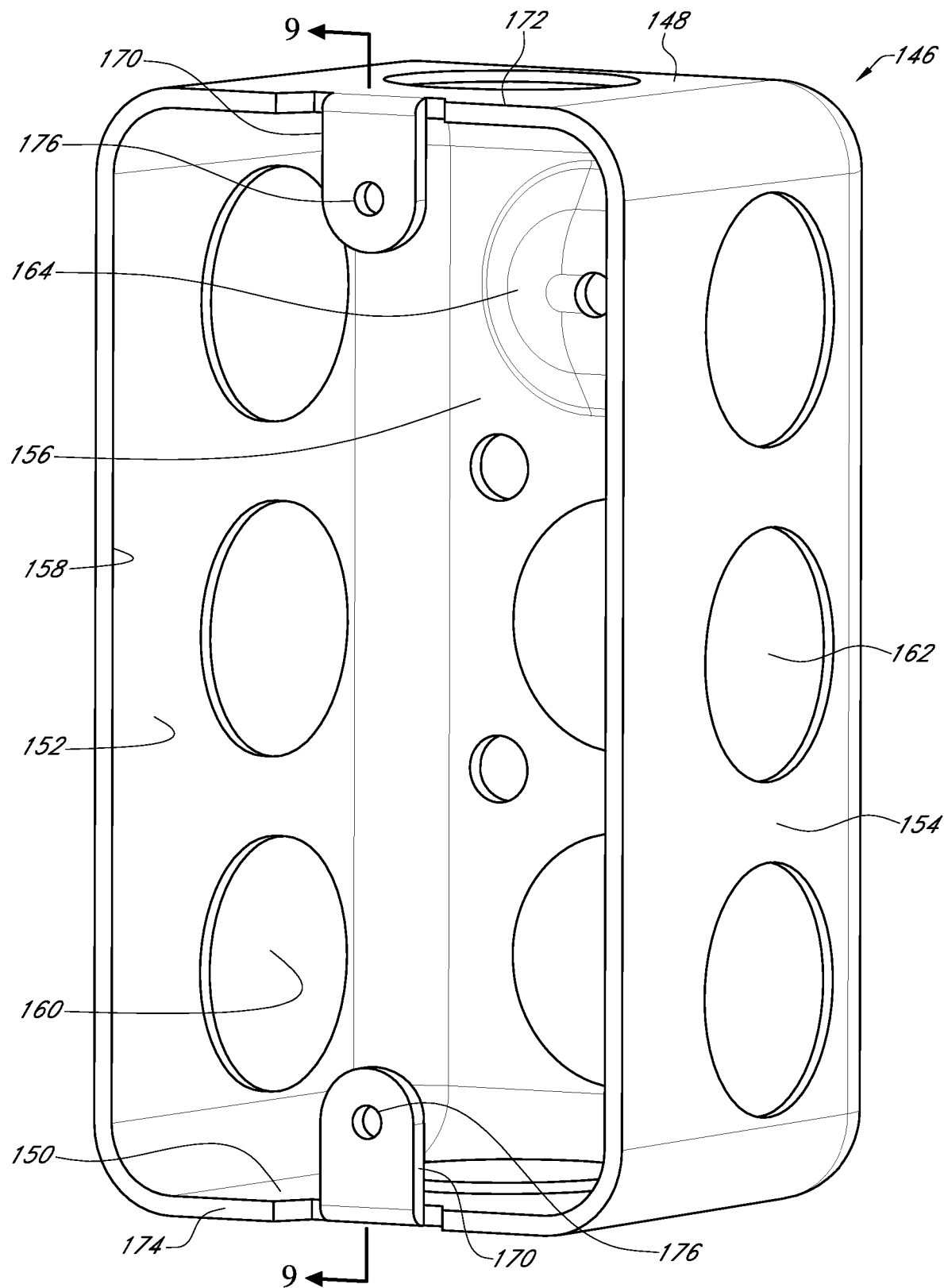
FIG. 7 is a front perspective view of the junction box of FIG. 4.

An example of a standard-sized, single-gang junction box 146 is illustrated in FIGS. 7-9. With reference to FIG. 7, the junction box 146 is shaped substantially as a rectangular parallelepiped having a top wall 148, a bottom wall 150, left and right side walls 152, 154, a rear wall 156, and a front opening 158. Each of the walls 148, 150, 152, 154, 156 includes at least one circular boss 160, with the side walls 152, 154 each having three evenly spaced circular bosses 160, the rear wall 156 having two spaced circular bosses 160, and the top and bottom walls 148, 150 each having a single circular boss 160. Each of the circular bosses 160 extends into the interior space of the junction box 146, creating a plurality of elevated circular portions on the interior surfaces of the walls 148, 150, 152, 154, 156 of the junction box 146 and corresponding circular depressions 162 on the exterior surfaces of the walls 148, 150, 152, 154, 156 of the junction box 146. An upper end of the rear wall 156 includes a convexity/concavity 164 that extends into the interior space of the junction box 146, creating an elevated convex portion 166 on the interior surface of the rear wall 156 of the junction box 146 (FIG. 9) and a corresponding depressed concave portion 168 on the exterior surface of the rear wall 156 of the junction box 146. With reference to FIG. 7, the junction box 146 further includes a pair of tabs 170 that extend inwardly from a center of the upper edge 172 and a center of the lower edge 174, respectively, of the front opening 142. Each tab 170 includes an aperture 176 for receiving a fastening member to secure the A/V recording and communication device 130 within the junction box 146, as described below.

Example dimensions of the standard-sized junction box 146 are illustrated in FIGS. 8 and 9. With reference to FIG. 8, the junction box 146 has an interior height of about 94.37 mm (3.72") and an interior width of about 47.59 mm (1.87") as measured on the bosses 160, and an interior height of about 96.32 mm (3.79") and an interior width of about 49.48 mm (1.95") as measured off the bosses 160. With reference to FIG. 9, the junction box 146 has an interior depth of about 40.20 mm (1.58") as measured from the front edge surface 178 to the elevated convex portion 166 on the interior surface of the rear wall 156, an interior depth of about 45.20 mm (1.78") as measured from the front edge surface 178 to either of the two circular bosses 160 on the interior surface of the rear wall 156, and an interior depth of about 46.20 mm (1.82") as measured from the front edge surface 178 to the interior surface of the rear wall 156 away from the elevated convex portion 166 and the two circular bosses 160.

Figure 11:
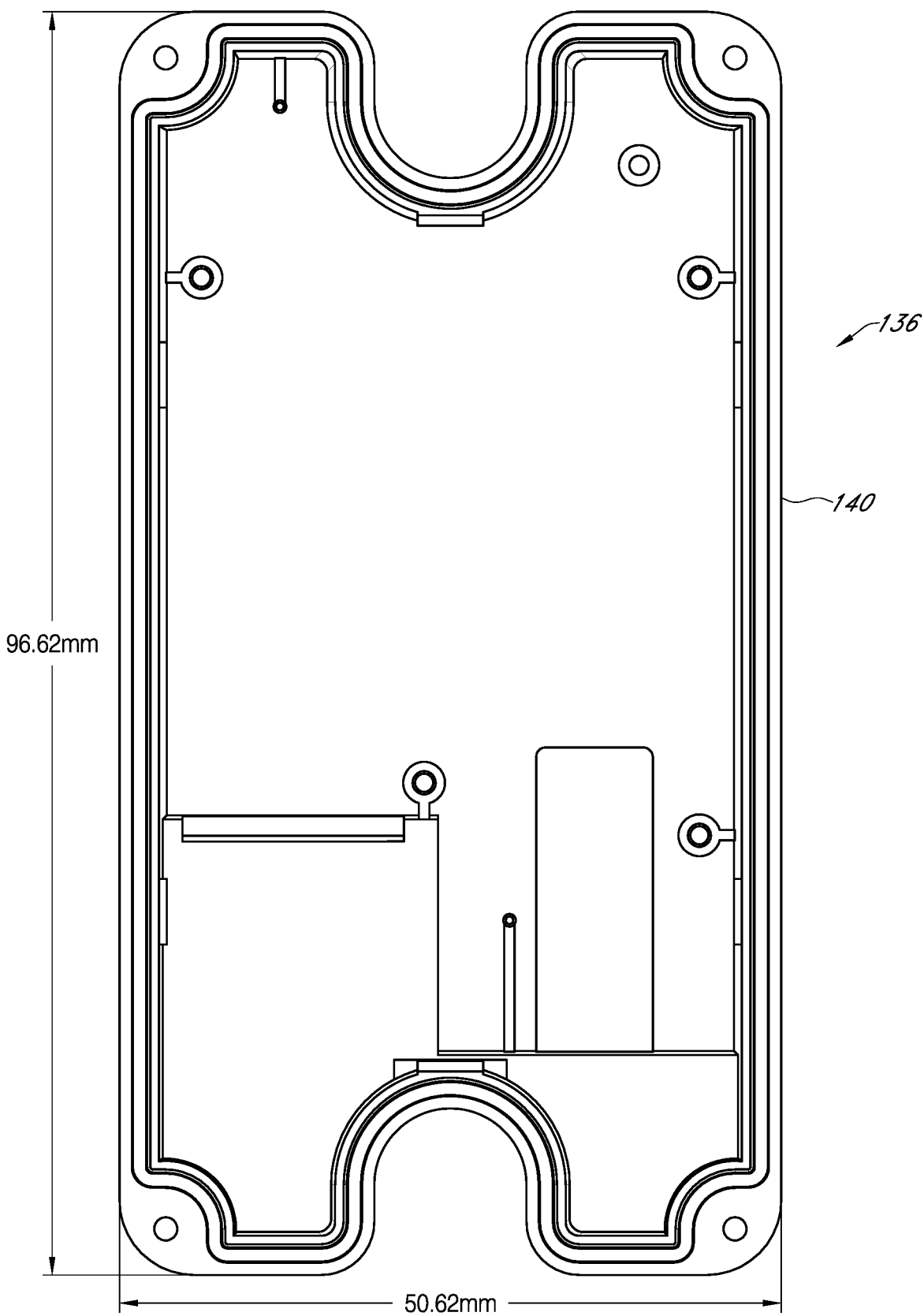
FIG. 11 is a front elevational view of the housing of FIG. 10.
Figure 12:
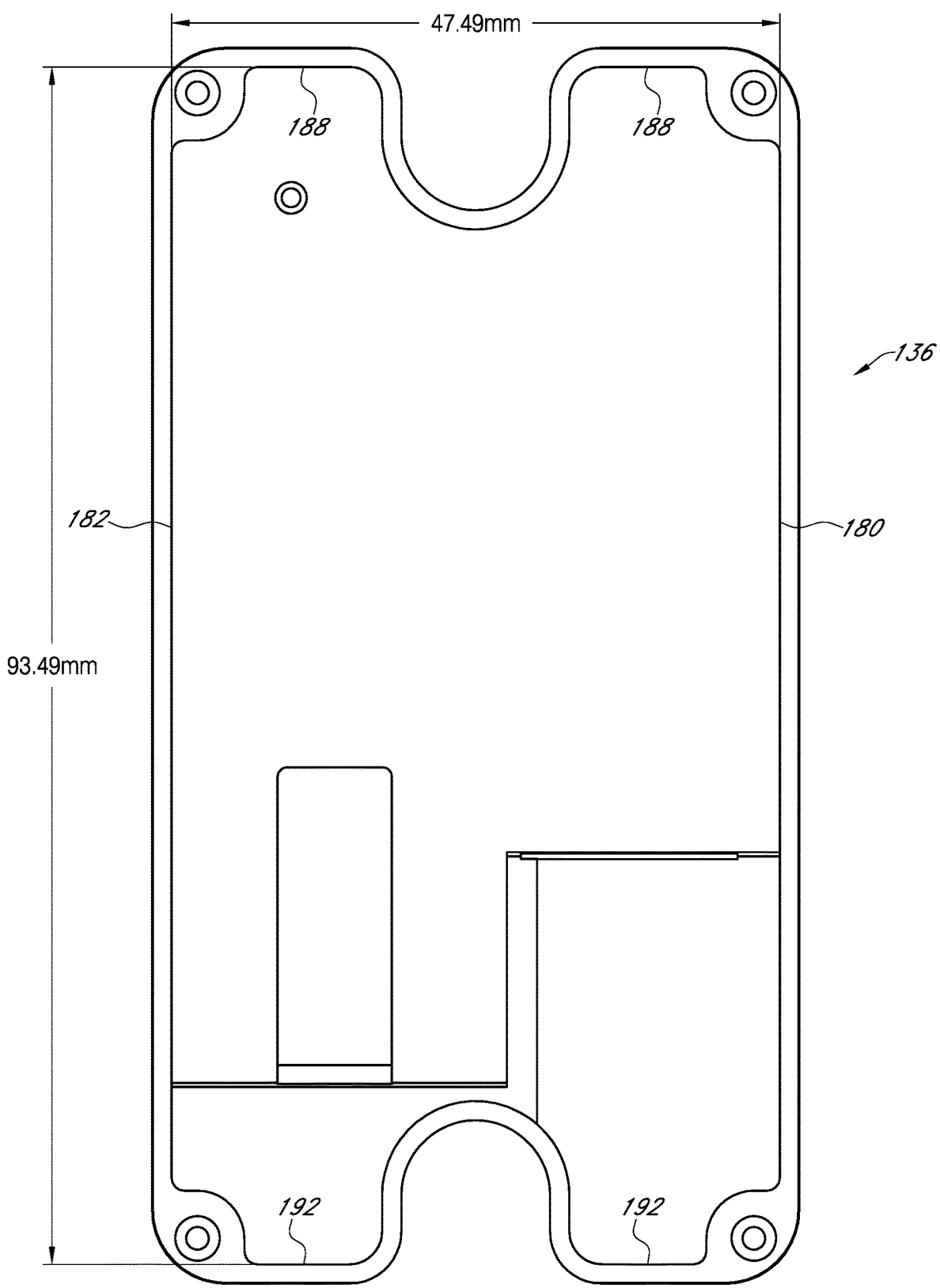
FIG. 12 is a rear elevational view of the housing of FIG. 10.

With reference to FIGS. 5 and 10, the housing 136, which is sized and configured to fit within the standard-sized junction box 146, is shaped substantially as a rectangular parallelepiped having left and right side walls 180, 182, a rear wall 184, the front opening 142, a pair of upper splines 188 separated by an upper channel 190, and a pair of lower splines 192 separated by a lower channel 194. Example dimensions of the housing 136 are illustrated in FIGS. 10-12. With reference to FIG. 10, the housing 136 has an exterior depth of about 36.20 mm (1.43") as measured from the front surface 196 of the forward lip portion 140 to the exterior surface of the rear wall 184. With reference to FIG. 11, the housing 136 has an exterior height of about 96.62 mm (3.80") as measured on the forward lip portion 140, and an exterior width of about 50.62 mm (1.99") as measured on the forward lip portion 140. With reference to FIG. 12, the housing 136 has an exterior height of about 93.49 mm (3.68") as measured between the exterior surfaces of the upper and lower splines 188, 192, and an exterior width of about 47.49 mm (1.87") as measured between the exterior surfaces of the left and right side walls 180, 182.

The dimensions provided above for either or both of the junction box 146 and the housing 136 may vary within normal manufacturing tolerances, such as, for example, ±1 mm. Further, the dimensions of the housing 136 may vary to enable the A/V recording and communication device 130 to fit within junction boxes of different sizes. For example, in alternative embodiments the housing 136 may be sized and configured to fit within a junction box (not shown) having an interior height of about 76 mm (2.99"), an interior width of about 49 mm (1.93"), and an interior depth of about 40 mm (1.57"). In such an embodiment, the housing 136 may omit (or reduce the height(s) of) the upper and/or lower splines 188, 192, for example, in order to reduce the height of the housing 136.

Figure 13:
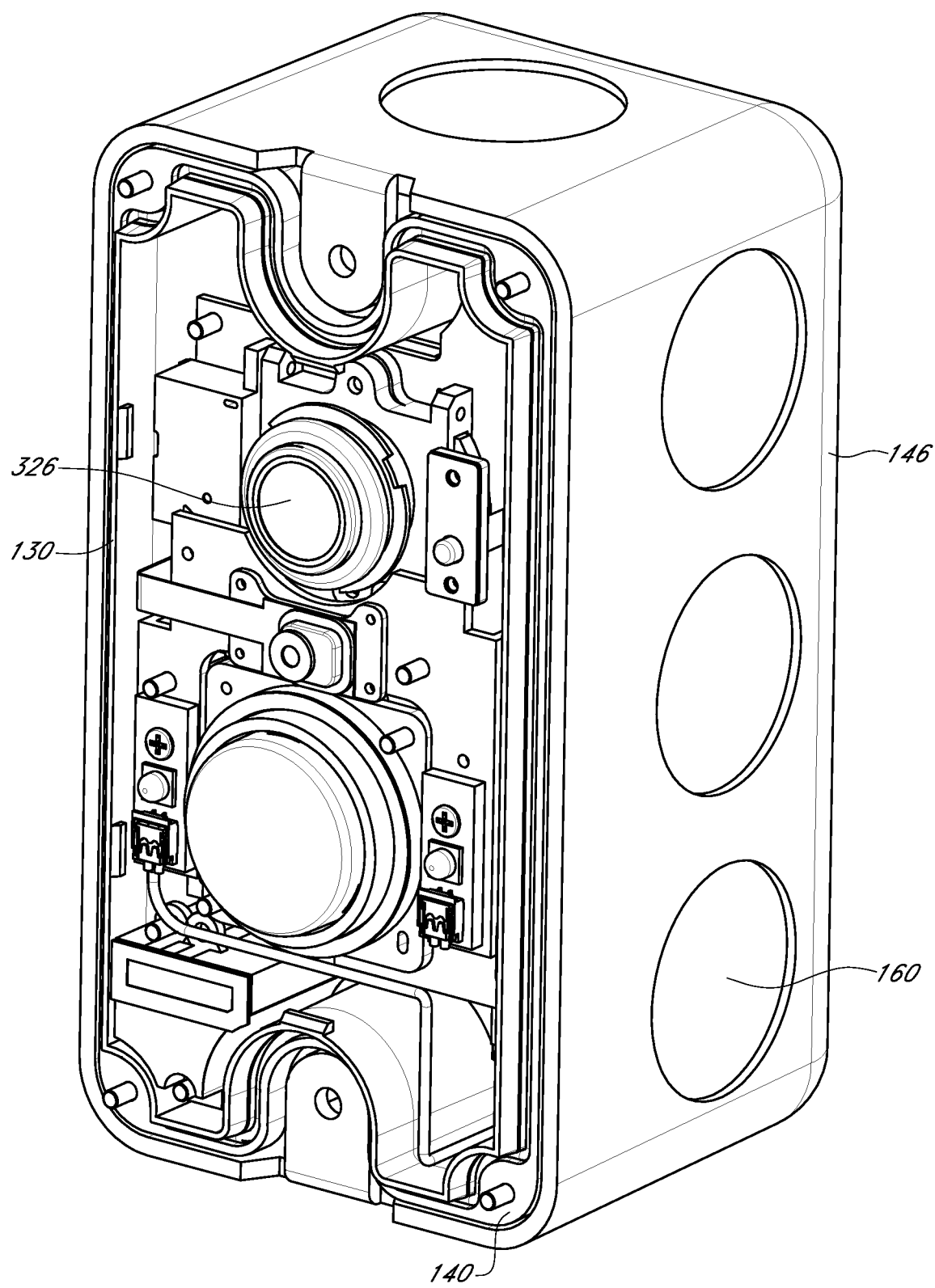
FIG. 13 is a front perspective view of the A/V recording and communication device of FIG. 3 engaged with a junction box and with some forward-facing components of the A/V recording and communication device removed.

In the example dimensions provided above for the junction box 146 and the housing 136, the exterior height (96.62 mm) and the exterior width (50.62 mm) of the forward lip portion 140 of the housing 136 are each greater than the interior height (96.32 mm) and the interior width (49.48 mm), respectively, of the junction box 146 as measured off the bosses 160. These relative dimensions create an interference fit between the forward lip portion 140 of the housing 136 and the junction box 146. With reference to FIG. 13, when the A/V recording and communication device 130 is seated within the junction box 146, the forward lip portion 140 of the housing 136 abuts the interior surfaces of the junction box 146 forward of the circular bosses 160. The interference fit between the forward lip portion 140 of the housing 136 and the junction box 146 advantageously resists moisture intrusion into the interior space of the junction box 146, thereby enhancing the ability of the A/V recording and communication device 130 to be deployed in outdoor environments. The housing 136 may be constructed of any suitable material that is durable and preferably impervious to moisture, such as various plastics. Example plastics include, without limitation, nylon, polycarbonate, polyethylene, polypropylene, polyurethane, ethylene-vinyl acetate (EVA), and acrylonitrile butadiene styrene (ABS). Further examples of plastics include, without limitation, blends of any of the foregoing plastics. For example, in one non-limiting example embodiment the housing 136 may comprise a blend of ABS and polycarbonate.

Figure 19:
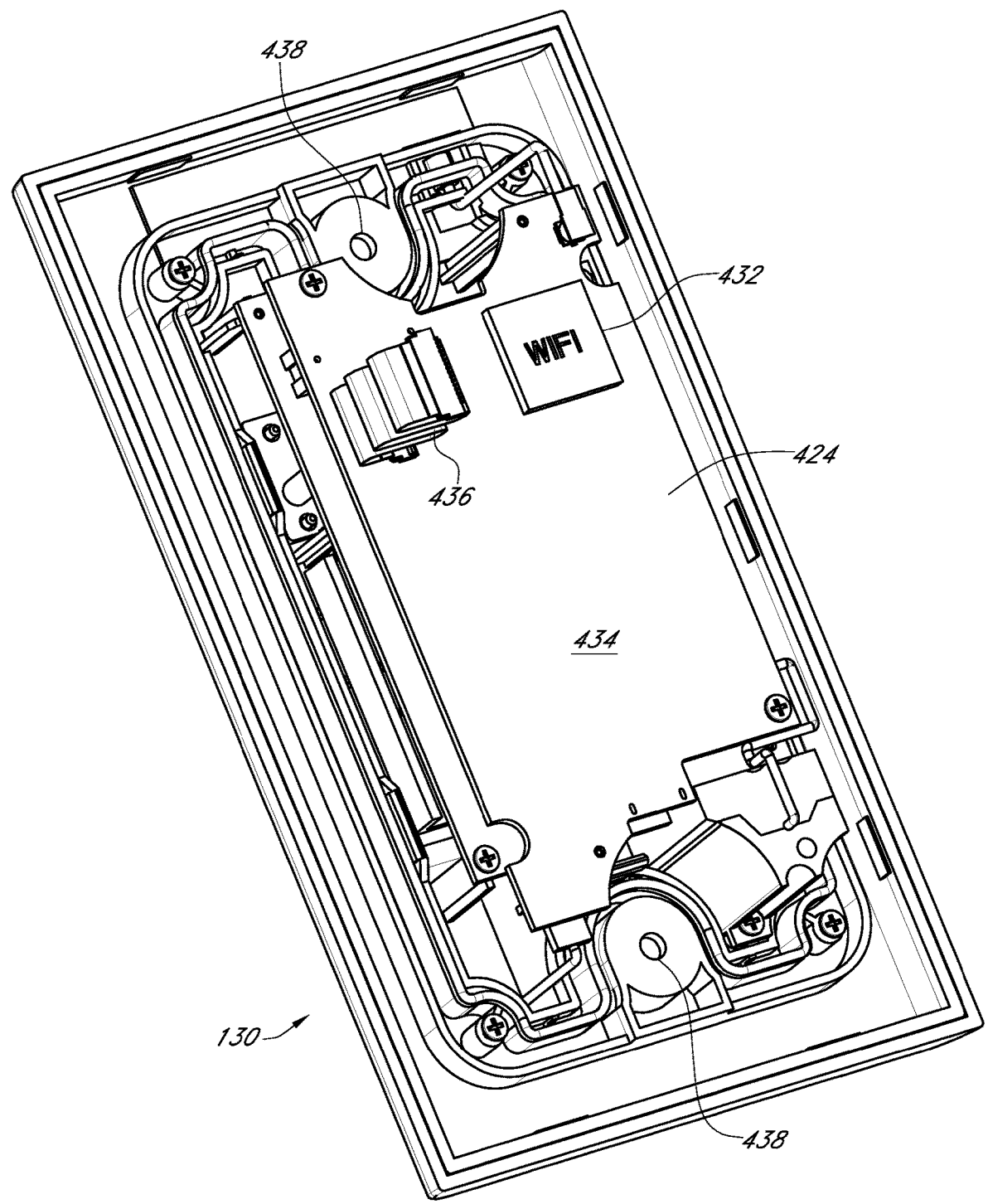
FIG. 19 is a rear perspective view of the A/V recording and communication device of FIG. 18 with additional rear-facing components removed.

With reference to FIGS. 7, 10, and 13, the upper and lower channels 190, 194 (FIG. 10) in the housing 136 accommodate the tabs 170 (FIG. 7) on the junction box 146 to facilitate inserting the A/V recording and communication device 130 into the junction box 146 through the front opening 158. With reference to FIG. 19, the front face plate 134 includes upper and lower apertures 438 that align with the upper and lower apertures 176 (FIG. 7) on the tabs 170 on the junction box 146. Fastening members, such as screws (not shown), may be inserted into the aligned apertures 176, 438 to secure the A/V recording and communication device 130 within the junction box 146.

Figure 14:
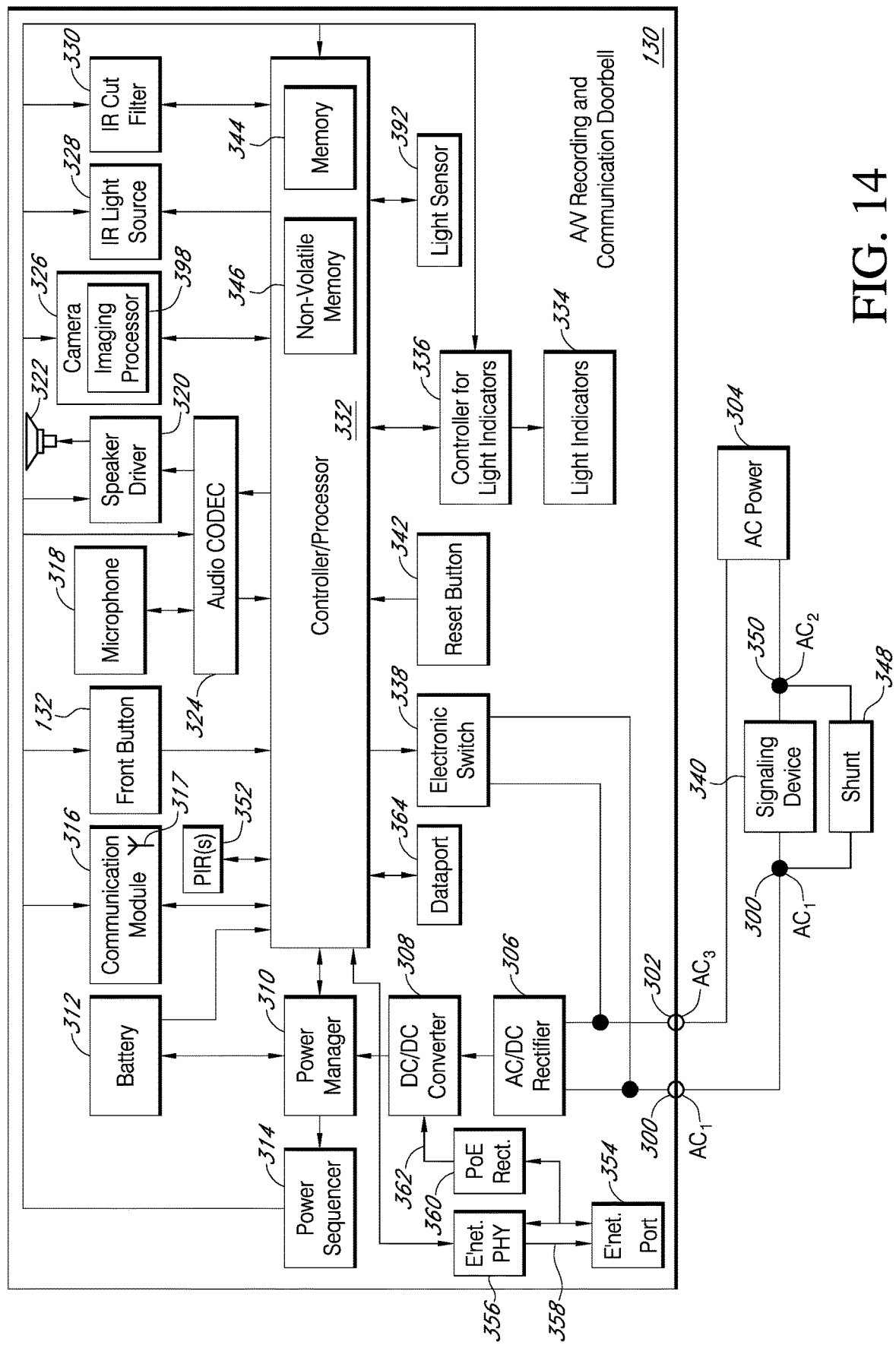
FIG. 14 is a functional block diagram of the components of the A/V recording and communication device of FIG. 3.

FIG. 14 is a functional block diagram illustrating the components of one embodiment of the A/V recording and communication device 130 and their relationships to one another. For example, the A/V recording and communication device 130 includes a pair of terminals 300, 302 configured to be connected to a source of external AC (alternating-current) power, such as a household AC power supply 304 (may also be referred to as AC mains). The AC power supply 304 may have a voltage in the range of 16-24 VAC, for example. The incoming AC power supply 304 may be converted to DC (direct-current) by an AC/DC rectifier 306. An output of the AC/DC rectifier 306 may be connected to an input of a DC/DC converter 308, which may step down the voltage from the output of the AC/DC rectifier 306 from 16-24 VDC to a lower voltage of about 5 VDC, for example. In various embodiments, the output of the DC/DC converter 308 may be in a range of from about 2.5 V to about 7.5 V, for example.

With further reference to FIG. 14, the output of the DC/DC converter 308 is connected to a power manager 310, which may comprise an integrated circuit including a processor core, memory, and/or programmable input/output peripherals. In one non-limiting example, the power manager 310 may be an off-the-shelf component, such as the BQ24773 chip manufactured by Texas Instruments. As described in detail below, the power manager 310 controls, among other things, an amount of power drawn from the external power supply 304, as well as an amount of supplemental power drawn from a battery 312, to power the A/V recording and communication device 130. The power manager 310 may, for example, limit the amount of power drawn from the external power supply 304 so that a threshold power draw is not exceeded. In one non-limiting example, the threshold power, as measured at the output of the DC/DC converter 308, may be equal to 1.4 A. The power manager 310 may also control an amount of power drawn from the external power supply 304 and directed to the battery 312 for recharging of the battery 312. An output of the power manager 310 is connected to a power sequencer 314, which controls a sequence of power delivery to other components of the A/V recording and communication device 130, including a communication module 316, the front button 132, a microphone 318, a speaker driver 320, a speaker 322, an audio CODEC (Coder-DECoder) 324, a camera 326, an infrared (IR) light source 328, an IR cut filter 330, a processor 332 (may also be referred to as a controller 332), a plurality of light indicators 334, and a controller 336 for the light indicators 334. Each of these components is described in detail below. The power sequencer 314 may comprise an integrated circuit including a processor core, memory, and/or programmable input/output peripherals. In one non-limiting example, the power sequencer 314 may be an off-the-shelf component, such as the RT5024 chip manufactured by Richtek. The communication module 316 may include a wireless antenna 317 to facilitate transmission and receipt of wireless communications.

With further reference to FIG. 14, the A/V recording and communication device 130 further comprises an electronic switch 338 that closes when the front button 132 is depressed. When the electronic switch 338 closes, power from the AC power source 304 is diverted through a signaling device 340 that is external to the A/V recording and communication device 130 to cause the signaling device 340 to emit a sound, as further described below. In one non-limiting example, the electronic switch 338 may be a triac device. The A/V recording and communication device 130 further comprises a reset button 342 configured to initiate a hard reset of the processor 332, as further described below.

With further reference to FIG. 14, the processor 332 may perform data processing and various other functions, as described below. The processor 332 may comprise an integrated circuit including a processor core, memory 344, non-volatile memory 346, and/or programmable input/output peripherals (not shown). The memory 344 may comprise, for example, DDR3 (double data rate type three synchronous dynamic random-access memory). The non-volatile memory 346 may comprise, for example, NAND flash memory. In the embodiment illustrated in FIG. 14, the memory 344 and the non-volatile memory 346 are illustrated within the box representing the processor 332. The embodiment illustrated in FIG. 14 is, however, merely an example, and in some embodiments the memory 344 and/or the non-volatile memory 346 are not necessarily physically incorporated with the processor 332. The memory 344 and/or the non-volatile memory 346, regardless of their physical location, may be shared by one or more other components (in addition to the processor 332) of the present A/V recording and communication device 130.

The transfer of digital audio between the user and a visitor may be compressed and decompressed using the audio CODEC 324, which is operatively coupled to the processor 332. When the visitor speaks, audio from the visitor is compressed by the audio CODEC 324, digital audio data is sent through the communication module 316 to the network 112 via the user's network 110, routed by the server 118 and delivered to the user's client device 114 (FIG. 1). When the user speaks, after being transferred through the network 112, the user's network 110, and the communication module 316, the digital audio data is decompressed by the audio CODEC 324 and emitted to the visitor through the speaker 322, which is driven by the speaker driver 320.

With further reference to FIG. 14, some of the present embodiments may include a shunt 348 connected in parallel with the signaling device 340. The shunt 348 facilitates the ability of the A/V recording and communication device 130 to draw power from the AC power source 304 without inadvertently triggering the signaling device 340. The shunt 348, during normal standby operation, presents a relatively low electrical impedance, such as a few ohms, across the terminals 300, 350 of the signaling device 340. Most of the current drawn by the A/V recording and communication device 130, therefore, flows through the shunt 348, and not through the signaling device 340. The shunt 348, however, contains electronic circuitry that switches the shunt 348 between a state of low impedance, such as a few ohms, for example, and a state of high impedance, such as >1K ohms, for example. When the front button 132 of the A/V recording and communication device 130 is pressed, the electronic switch 338 closes, causing the voltage from the AC power source 304 to be impressed mostly across the shunt 348 and the signaling device 340 in parallel, while a small amount of voltage, such as about 1V, is impressed across the electronic switch 338. The circuitry in the shunt 348 senses this voltage, and switches the shunt 348 to the high impedance state, so that power from the AC power source 304 is diverted through the signaling device 340. The diverted AC power supply 304 is above the threshold necessary to cause the signaling device 340 to emit a sound. Pressing the front button 132 of the A/V recording and communication device 130 therefore causes the signaling device 340 to sound, alerting any person(s) within the structure to which the A/V recording and communication device 130 is mounted that there is a visitor at the front door (or at another location corresponding to the location of the A/V recording and communication device 130). In one non-limiting example, the electronic switch 338 may be a triac device.

As described above, the A/V recording and communication device 130 may be connected to an external power source 304 (FIG. 14), such as AC mains. The A/V recording and communication device 130 is primarily powered by the external power source 304, and, when the external power source 304 comprises AC mains, the A/V recording and communication device 130 may also draw power from the rechargeable battery 312 so as not to exceed a threshold amount of power from the external power source 304, to thereby avoid inadvertently sounding the signaling device 340. With reference to FIG. 14, the battery 312 is operatively connected to the power manager 310. The power manager 310 controls an amount of power drawn from the battery 312 to supplement the power drawn from the external AC power source 304 to power the A/V recording and communication device 130 when supplemental power is needed. The power manager 310 also controls recharging of the battery 312 using power drawn from the external power source 304. The battery 312 may comprise, for example, a lithium-ion battery, or any other type of rechargeable battery.

The A/V recording and communication device 130 may further include a battery heater (not shown). The present A/V recording and communication device 130 is configured for outdoor use, including in cold climates. Cold temperatures, however, can cause negative performance issues for rechargeable batteries, such as reduced energy capacity, increased internal resistance, reduced ability to charge without damage, and reduced ability to supply load current. The battery heater may help to keep the rechargeable battery 312 warm in order to reduce or eliminate the foregoing negative performance issues. The battery heater may comprise, for example, an electrically resistive heating element in contact with the rechargeable battery 312 and that produces heat when electrical current is passed through it. The battery heater may thus be operatively coupled to the power manager 310 and/or the power sequencer 314 (FIG. 14). In some embodiments, the rechargeable battery 312 may include a thermally sensitive resistor ("thermistor," not shown) operatively connected to the processor 332 so that the battery 312's temperature can be monitored and the amount of power supplied to the battery heater can be adaptively controlled to keep the rechargeable battery 312 within a desired temperature range.

With further reference to FIG. 14, the A/V recording and communication device 130 may further comprise one or more motion sensors 352, which may in some embodiments comprise one or more passive infrared sensors (PIRs). The PIR(s) 352 is/are operatively connected to the processor 332, and may be configured to sense movement of people, animals, or other objects within its/their field of view. When motion is detected, one or more components and/or functions of the A/V recording and communication device 130 may be activated. For example, the camera 326 may begin recording (or continue recording), and/or an alert may be sent to the user's client device 114 as described above with respect to FIGS. 1 and 2.

With further reference to FIG. 14, the A/V recording and communication device 130 may further comprise an Ethernet port 354, which facilitates a wired connection between the A/V recording and communication device 130 and the user's network 110. The Ethernet port 354 may provide a physical Ethernet connection, such as an RJ-45 type connector, and may have one or more of integrated LEDs, isolation magnetics, resistors, and/or capacitors. The Ethernet port 354 may include electrical connection to an Ethernet PHY (physical layer, chip) device 356, which is operatively connected to the processor 332. The Ethernet PHY device 356 processes and formats the physical interface signals so that the processor 332 can properly receive and transmit information via the Ethernet connection. The Ethernet PHY device 356 may also provide LED drive signals 358 for LEDs (not shown), which may be integrated into the Ethernet port 354. The Ethernet port 354 may also be connected to a Power over Ethernet (PoE) rectifier 360, such that the A/V recording and communication device 130 may be powered by PoE. PoE describes any of several standardized or ad-hoc systems that pass electric power along with data on twisted pair Ethernet cabling, thereby allowing a single cable to provide both data connection and electric power. The PoE rectifier 360 may comprise a plurality of diodes (such as eight diodes), which may be arranged as two bridge rectifiers, for example, so that even if incoming power is of reverse polarity, it will still be usable without processor intervention, and such that both IEEE 802.3af standards A and B are supported automatically. An output 362 of the PoE rectifier 360 may provide a power input to the DC/DC converter 308, which may be an isolated type of switching type power to the input of the DC/DC converter 308, and the DC/DC converter 308 may automatically select one power input, such as whichever one is available, or may default to one or the other if both are present and available.

With further reference to FIG. 14, the A/V recording and communication device 130 may further comprise a dataport 364. The dataport 364 may be any type of connector used for physically interfacing with the A/V recording and communication device 130, such as a USB port, a mini-USB port, a micro-USB port, etc. The dataport 364 is operatively connected to the processor 332, and may be used to transfer data to and/or from the memory 344 and/or the non-volatile memory 346. The dataport 364 may also be used to recharge the battery 312.

With reference to FIG. 3, a front of the A/V recording and communication device 130 includes the front button 132, which is operatively connected to the processor 332 (FIG. 14). In a process similar to that described above with reference to FIG. 2, when a visitor presses the front button 132, an alert may be sent to the user's client device 114 (FIG. 1) to notify the user that someone is at his or her front door (or at another location corresponding to the location of the A/V recording and communication device 130). With reference to FIGS. 3 and 13, the A/V recording and communication device 130 further includes the camera 326 (FIG. 13), which is operatively connected to the processor 332 (FIG. 14), and which is located behind a lens cover 366 (FIG. 3). The camera 326 is configured to capture video images from within its field of view. Those video images can be streamed to the user's client device 114 and/or uploaded to a remote network device 116, 118, 120 (FIG. 1) for later viewing according to a process similar to that described above with reference to FIG. 2.

Figure 20:
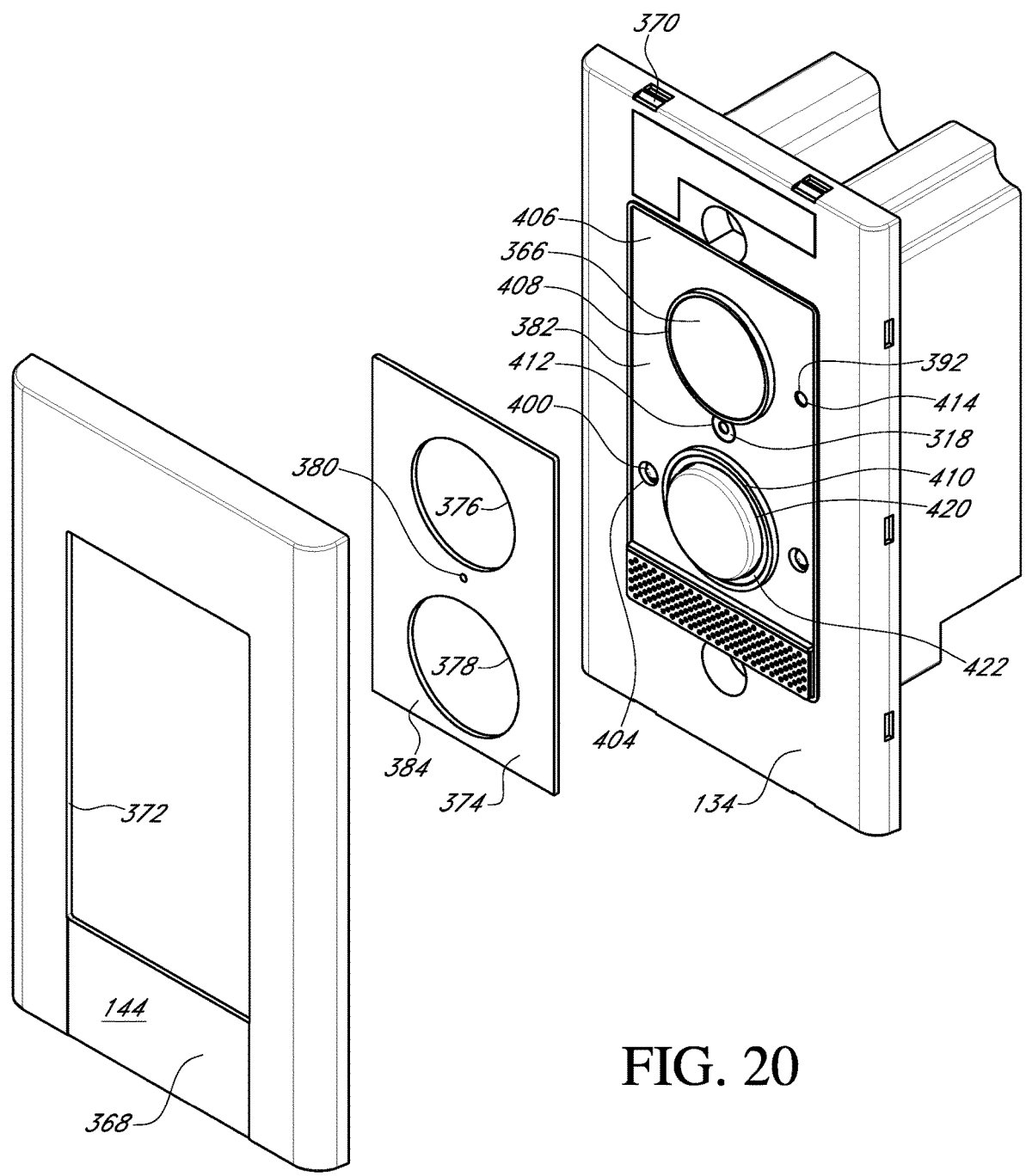
FIG. 20 is a partially exploded front perspective view of the A/V recording and communication device of FIG. 3 showing the shell and the shield removed from the front cover plate.

With reference to FIGS. 3 and 20, the A/V recording and communication device 130 further comprises the shell 144 overlying the front face plate 134. The shell 144 includes a recess (not shown) located behind a front surface 368, wherein the recess is sized and shaped to receive the front face plate 134 in a close fitting engagement, such that outer surfaces of the front face plate 134 abut conforming inner surfaces of the shell 144. Exterior dimensions of the front face plate 134 may be closely matched with interior dimensions of the shell 144 such that friction maintains the shell 144 about the front face plate 134. Alternatively, or in addition, the front face plate 134 and/or the shell 144 may include mating features 370, such as one or more tabs, grooves, slots, posts, etc. to assist in maintaining the shell 144 about the front face plate 134. In some embodiments, multiple shells 144 in different colors may be provided so that the end user may customize the appearance of his or her A/V recording and communication device 130. For example, the A/V recording and communication device 130 may be packaged and sold with multiple shells 144 in different colors in the same package.

With reference to FIGS. 3 and 20, the shell 144 includes a central opening 372 in the front surface 368. The central opening 372 is sized and shaped to accommodate a shield 374. With reference to FIG. 20, in the illustrated embodiment, the shield 374 is substantially rectangular, and includes an upper opening 376 to accommodate the camera 326, a lower opening 378 through which the front button 132 protrudes, and a central opening 380 positioned in front of the microphone 318. The shield 374 defines a plane parallel to and in front of a front surface 382 of the front face plate 134. When the shell 144 is mated with the front face plate 134, as shown in FIG. 3, the shield 374 resides within the central opening 372 of the shell 144 such that a front surface 384 of the shield 374 is substantially flush with the front surface 368 of the shell 144 and there is little or no gap between the outer edges of the shield 374 and the inner edges of the central opening 372 in the shell 144.

With reference to FIG. 5, the A/V recording and communication device 130 includes a two-pin connector 386 exposed through an opening 388 in the rear wall 184 of the housing 136. The two-pin connector 386 is connected to the terminals 300, 302 (FIG. 14) of the A/V recording and communication device 130. The two-pin connector 386 is configured to receive a mating connector at the ends of electrical wires (not shown) to connect to the A/V recording and communication device 130, through the terminals 300, 302, to the household AC power supply 304 of the structure on which the A/V recording and communication device 130 is mounted. In the illustrated embodiment, the two-pin connector 386 is located within the opening 386 in the rear wall 184 of the housing 136 so that the two-pin connector 386 does not protrude from the outer envelope of the housing 136.

Figure 15:
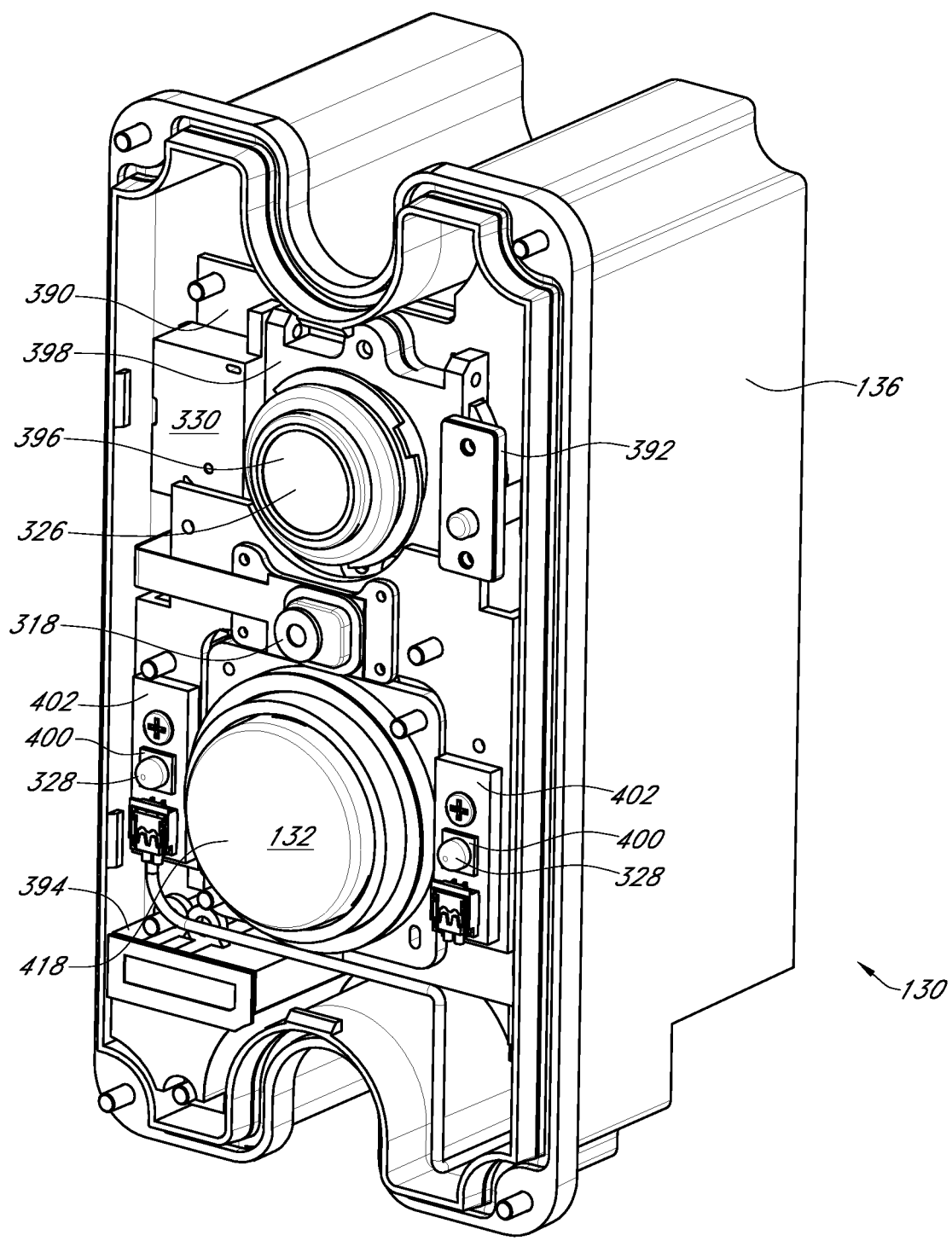
FIG. 15 is a front perspective view of the A/V recording and communication device of FIG. 13 without the junction box.
Figure 16:
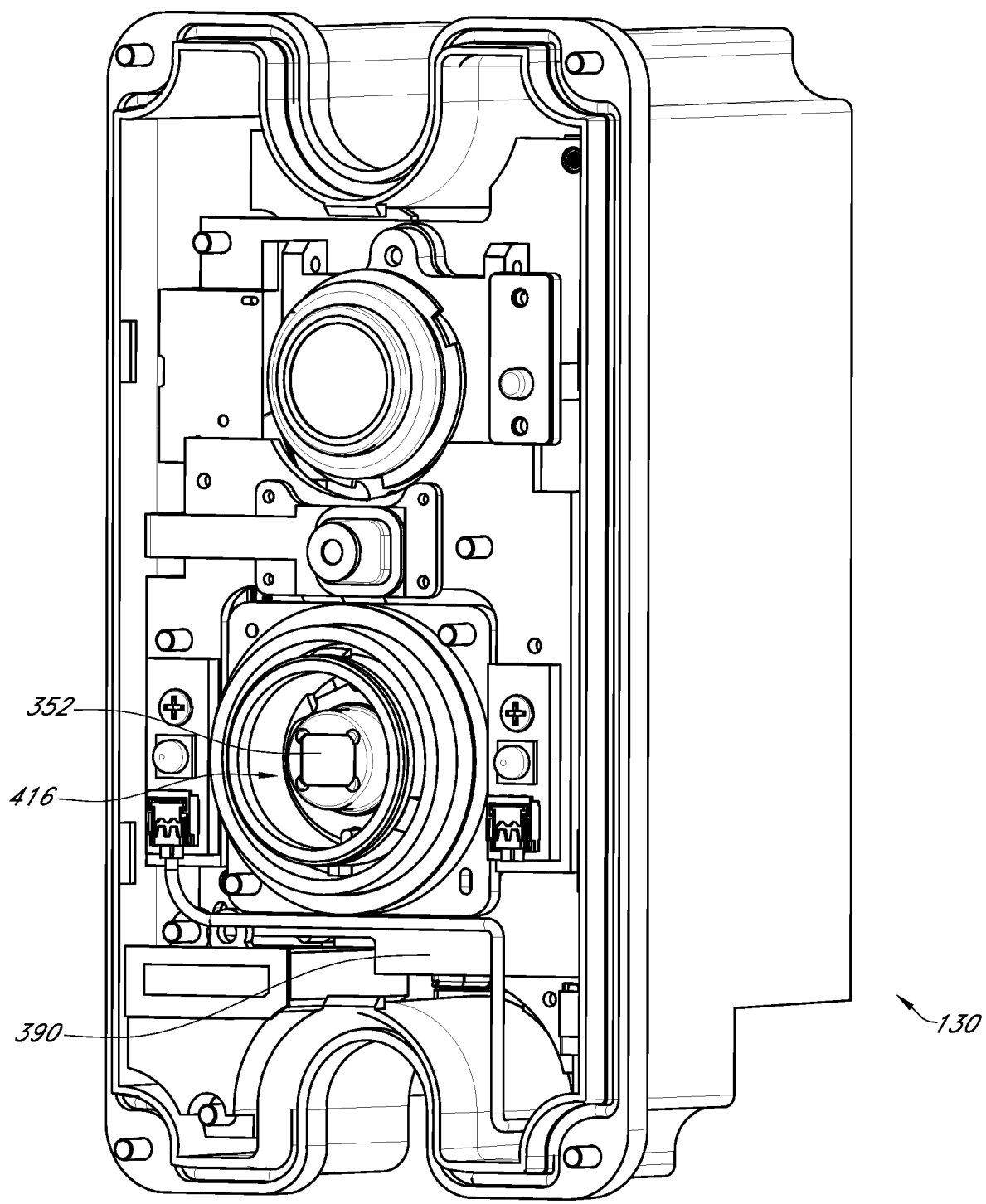
FIG. 16 is a front perspective view of the A/V recording and communication device of FIG. 15 with additional forward-facing components removed.
Figure 17:
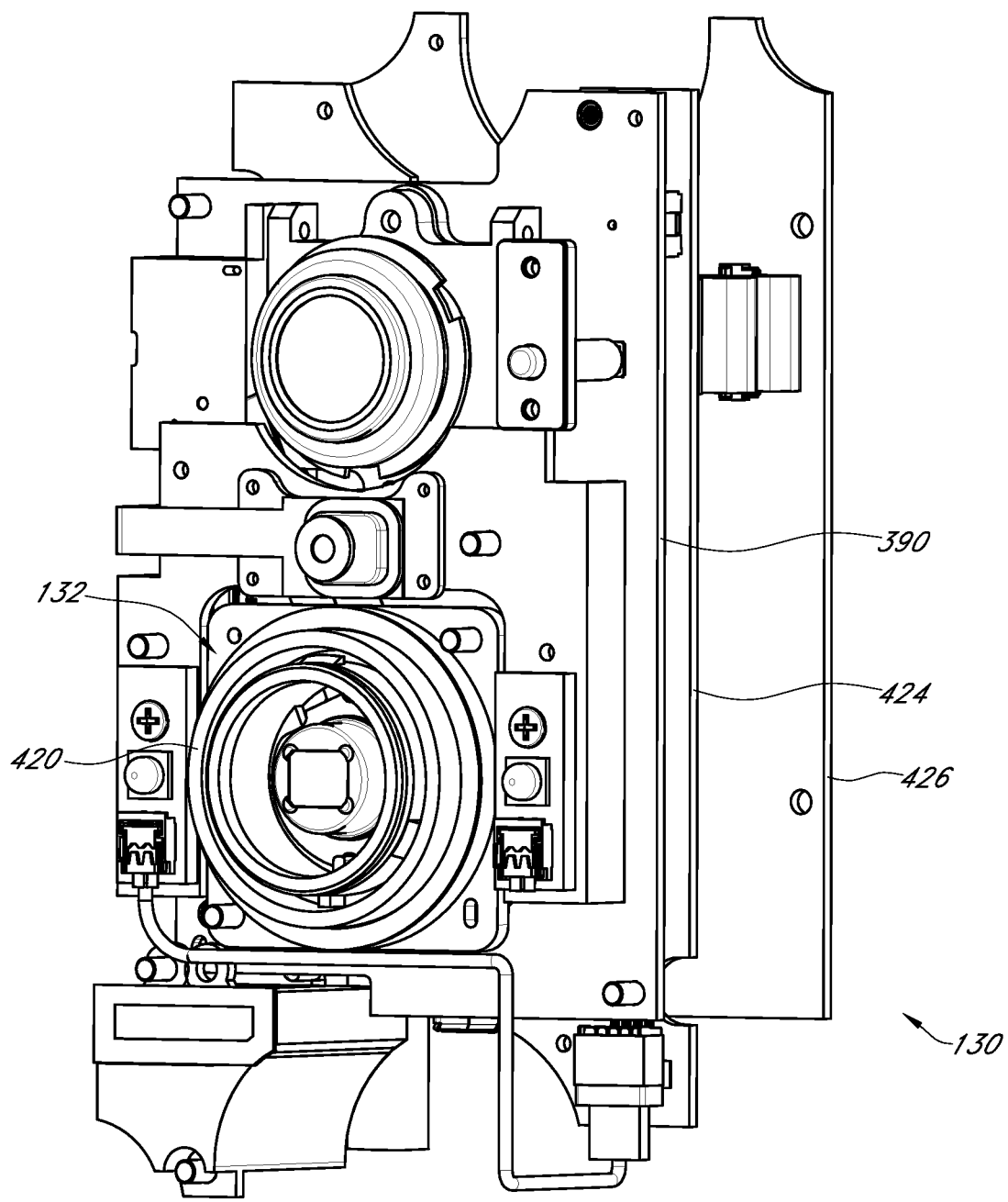
FIG. 17 is a front perspective view of the A/V recording and communication device of FIG. 16 with a rear housing removed.
Figure 18:
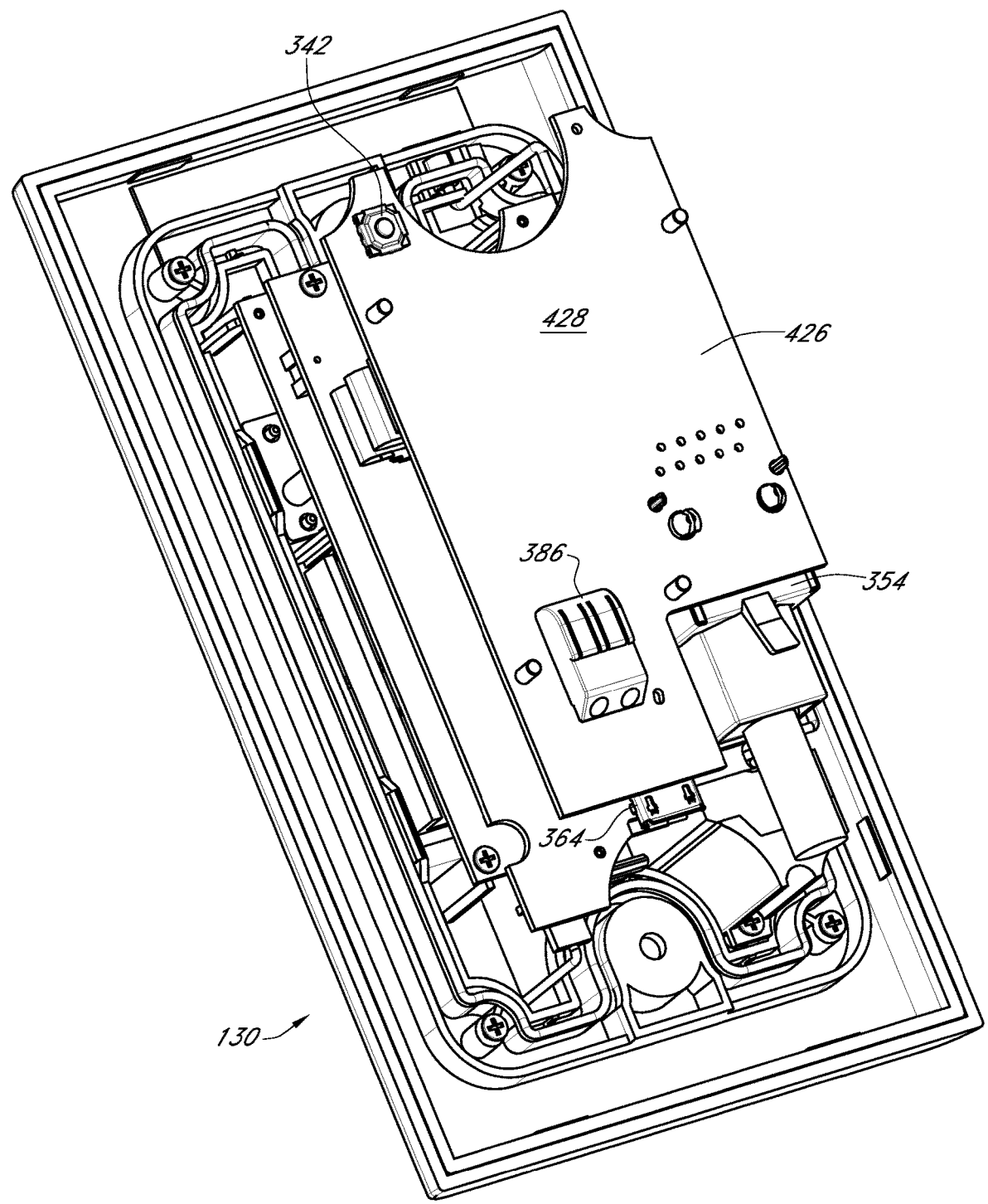
FIG. 18 is a rear perspective view of the A/V recording and communication device of FIG. 3 with a rear housing removed.

FIGS. 15-19 illustrate various internal components of the A/V recording and communication device 130. FIGS. 15 and 16 are front perspective views of the A/V recording and communication device 130 with the front face plate 134 removed, FIG. 17 is a front perspective view of the A/V recording and communication device 130 with the front face plate 134 and the housing 136 removed, while FIGS. 18 and 19 are rear perspective views of the A/V recording and communication device 130 with the housing 136 removed. With reference to FIG. 15, the A/V recording and communication device 130 comprises a plurality of components operatively connected to a front printed circuit board (PCB) 390, including the camera 326, a light sensor 392, the microphone 318, the front button 132, the IR light source 328, and a speaker chamber 394 (in which the speaker 322 is located).

The camera 326 is coupled to a front surface of the front PCB 390, and includes a lens 396 and an imaging processor 398 (FIG. 14). The camera lens 396 may be a lens capable of focusing light into the camera 326 so that clear images may be captured. The camera 326 may comprise, for example, a high definition (HD) video camera, such as one capable of capturing video images at an image display resolution of 1080p or better. In certain of the present embodiments, the camera 326 may be used to detect motion within its field of view, as described below. The light sensor 392, which is operatively connected to the processor 332 (FIG. 14), may detect the level of ambient light, and the detected level of ambient light may be used to determine when to activate the camera 326's night vision functionality, as discussed below.

With further reference to FIG. 15, the microphone 318, which may also be coupled to the front surface of the front PCB 390, is positioned between the camera 326 and the front button 132 at the front of the A/V recording and communication device 130 so that sounds emanating from the area around the A/V recording and communication device 130 can be detected by the microphone 318, thereby facilitating two-way audio communication between a visitor (or any other person) near the A/V recording and communication device 130 and a user of the client device 114 (FIG. 1). The speaker chamber 394 is similarly located at the front of the A/V recording and communication device 130, near the bottom of the housing 136. The speaker chamber 394 comprises a hollow enclosure in which the speaker 322 (FIG. 14) is located. The hollow speaker chamber 394 amplifies the sounds made by the speaker 322 so that they can be better heard by the visitor (or any other person) near the A/V recording and communication device 130, thereby also facilitating two-way audio communication between the visitor (or any other person) near the A/V recording and communication device 130 and the user of the client device 114 (FIG. 1).

With further reference to FIG. 15, the IR light source 328 comprises a pair of IR light-emitting diodes (LEDs) 400 coupled to a pair of IR LED printed circuit boards (PCBs) 402. In alternative embodiments, the IR LEDs 400 may not comprise separate PCBs 402, and may, for example, be coupled to the front PCB 390. The IR LED PCBs 402 are located on opposite sides of the front button 132. With reference to FIG. 20, the front face plate 134 includes a pair of openings 404 to accommodate the IR LEDs 400, and the shield 374 overlies the openings 404. In some embodiments, the shield 374 may comprise a material that is substantially transparent to infrared (IR) light, but partially or mostly opaque with respect to light in the visible spectrum. For example, in certain embodiments the shield 374 may comprise a plastic, such as polycarbonate. The shield 374, therefore, does not interfere with transmission of IR light from the IR LEDs 400, which are located behind the shield 374. The IR LEDs 400 and the IR cut filter 330, which are both operatively connected to the processor 332, facilitate "night vision" functionality of the camera 326. For example, the IR LEDs 400 may be triggered to activate when a low level of ambient light is detected. When activated, IR light emitted from the IR LEDs 400 illuminates the camera 326's field of view. The camera 326, which may be configured to detect IR light, may then capture the IR light emitted by the IR LEDs 400 as it reflects off objects within the camera 326's field of view, so that the A/V recording and communication device 130 can clearly capture images at night (may be referred to as "night vision").

With further reference to FIG. 20, the shield 374 may abut an underlying cover 406, which may be integral with the front face plate 134 or may be a separate piece. The cover 406, which may be opaque, may include a first opening 408 corresponding to the location of the camera 326 and the location of the upper opening 376 in the shield 374, a second opening 410 corresponding to the location of the front button 132 and the location of the lower opening 378 in the shield 374, a third opening 412 corresponding to the location of the microphone 318 and the location of the central opening 380 in the shield 374, and a fourth opening 414 corresponding to the location of the light sensor 392. The third opening 412 facilitates the passage of sound through the cover 406 so that the microphone 318 is better able to pick up sounds from the area around the A/V recording and communication device 130. The fourth opening 414 facilitates the passage of light through the cover 406 so that the light sensor 392 can detect the level of ambient light around the A/V recording and communication device 130.

With reference to FIG. 15, the A/V recording and communication device 130 further comprises the IR cut filter 330. The IR cut filter 330 is a mechanical shutter that can be selectively positioned between the lens 396 and the image sensor (not shown) of the camera 326. During daylight hours, or whenever there is a sufficient amount of ambient light, the IR cut filter 330 is positioned between the lens 396 and the image sensor to filter out IR light so that it does not distort the colors of images as the human eye sees them. During nighttime hours, or whenever there is little to no ambient light, the IR cut filter 330 is withdrawn from the space between the lens 396 and the image sensor, so that the camera 326 is sensitive to IR light ("night vision"). The light sensor 392 may detect the level of ambient light, and the detected level of ambient light may be used to control the current state of the IR cut filter 330 and to turn the IR LEDs 400 on and off. In alternative embodiments, the camera 326 may act as a light detector for use in controlling the current state of the IR cut filter 330 and turning the IR LEDs 400 on and off. Using the camera 326 as a light detector is facilitated in some embodiments by the fact that the A/V recording and communication device 130 is powered by a connection to AC mains or Power over Ethernet (PoE), and the camera 326, therefore, may be always powered on. In embodiments in which the camera 326 acts as a light detector, the light sensor 392 may be omitted, or the camera 326 and the light sensor 392 may work in tandem to detect the level of ambient light.

With reference to FIGS. 15 and 16, the front button 132 is hollow and forms an enclosure 416 (FIG. 16) that houses the at least one motion sensor 352. In the illustrated embodiment, the motion sensor 352 comprises a passive infrared (PIR) sensor, but in alternative embodiments the motion sensor 352 may comprise any other type of sensor. The motion sensor 352 may be configured to sense movement of people, animals, or other objects within its field of view. When motion is detected, one or more components and/or functions of the A/V recording and communication device 130 may be activated. For example, the camera 326 may begin recording (or continue recording), and/or an alert may be sent to the user's client device 114 as described above with respect to FIG. 2. Because the motion sensor 352 is located behind and/or within the front button 132, a front portion 418 (FIG. 15) of the front button 132 preferably comprises a material that does not substantially interfere with the transmission of infrared light. For example, in some embodiments, the front button 132 may comprise a plastic such as polycarbonate. Also in some embodiments, the front portion 418 of the front button 132 may comprise a Fresnel lens, which may be patterned to direct incoming light into the PIR(s) 352 located behind and/or within the front button 132.

With reference to FIG. 17, the front PCB 390 may further comprise a button actuator (not shown) located behind the front button 132. The front button 132 may include a stem (not shown) that extends behind the front button 132 to contact the button actuator. When the front button 132 is pressed, the stem depresses the button actuator, thereby closing the electronic switch 338 and sounding the signaling device 340 (FIG. 14), as described above.

With further reference to FIG. 17, the front PCB 390 may further comprise the light indicators (not shown in FIG. 17, but shown as component 334 in FIG. 14), which may illuminate when the front button 132 of the A/V recording and communication device 130 is pressed. In some embodiments, the light indicators 334 may comprise light-emitting diodes (LEDs) that are surface mounted to the front surface of the front PCB 390 and are arranged in a circle around the button actuator. The present embodiments are not limited, however, to the light indicators 334 being LEDs, and in alternative embodiments the light indicators 334 may comprise any other type of light-emitting device.

With further reference to FIG. 17, the A/V recording and communication device 130 further comprises a light pipe 420. The light pipe 420 is a transparent or translucent ring that encircles the front button 132. With reference to FIGS. 3 and 20, the light pipe 420 resides in an annular space between the front button 132 and the lower opening 378 in the shield 374 and the second opening 410 in the cover 406, with a front surface 422 of the light pipe 420 being substantially flush with the front surface 384 of the shield 374. A rear portion (not shown) of light pipe 420 may be positioned just in front of the light indicators 334, such that when the light indicators 334 are illuminated light is transmitted through the body of the light pipe 420 so that the light is visible at the front surface 422 of the light pipe 420. The light indicators 334 and the light pipe 420 thus provide a ring of illumination around the front button 132. The light pipe 420 may comprise a plastic, for example, or any other suitable material capable of transmitting light.

The light indicators 334 and the light pipe 420 may function as visual indicators for a visitor and/or a user. For example, the light indicators 334 may illuminate upon activation or stay illuminated continuously. In one aspect, the light indicators 334 may change color to indicate that the front button 132 has been pressed. The light indicators 334 may also indicate that the battery 312 needs recharging, or that the battery 312 is currently being charged, or that charging of the battery 312 has been completed. The light indicators 334 may indicate that a connection to the user's network 110 is good, limited, poor, or not connected. The light indicators 334 may be used to guide the user through setup or installation steps using visual cues, potentially coupled with audio cues emitted from the speaker 322.

With further reference to FIG. 17, the A/V recording and communication device 130 may further comprise a main PCB 424 positioned behind the front PCB 390 and a power PCB 426 positioned behind the main PCB 424. With reference to FIG. 18, which is a rear perspective view, the two-pin connector 386 and the reset button 342 may be mounted to the rear surface 428 of the power PCB 426, and the Ethernet port 354 and the dataport 364 may be mounted to the front surface of the power PCB 426. The reset button 342 may, when pressed, trigger the erasing of any data stored at the non-volatile memory 346 and/or at the memory 344 (FIG. 14), and/or may trigger a reboot of the processor 332. With reference to FIG. 5, the housing 136 includes an opening 430 through which the reset button 342 may be accessed with a long, thin tool, such as a paper clip. With reference to FIG. 19, a Wi-Fi chip 432, which may be a component of the communication module 316, may be mounted to the rear surface 434 of the main PCB 424. A power and/or data connector 436 may extend between and operatively connect the main PCB 424 and the power PCB 426.

As discussed above, the present disclosure provides numerous examples of methods and systems including A/V recording and communication doorbells, but the present embodiments are equally applicable for A/V recording and communication devices other than doorbells. For example, the present embodiments may include one or more A/V recording and communication security cameras instead of, or in addition to, one or more A/V recording and communication doorbells. An example A/V recording and communication security camera may include substantially all of the structure and functionality of the doorbell 130, but without the front button 132, the button actuator, and/or the light pipe 420.

The illustrated number and configuration of the PCBs 390, 424, 426 is merely one example and is not limiting in any way. In alternative embodiments, the components distributed among the PCBs 390, 424, 426 may be rearranged in any suitable fashion, such as by taking components from two or more PCBs and positioning them on a single PCB, or by taking the components from a single PCB and positioning them across two or more PCBs. The names of the PCBs are similarly not limiting in any way.

As described above, the present embodiments leverage the capabilities of audio/video (A/V) recording and communication devices, thereby providing enhanced functionality to such devices to reduce crime and increase public safety. One aspect of the present embodiments includes the ability to fit the housing 136 within a junction box 146. The rear surface of the front face plate 134 can thus abut the surface of the wall in which the junction box 146 is located, enabling the A/V recording and communication device 130 to be substantially flush mounted on the wall.

Figure 21:
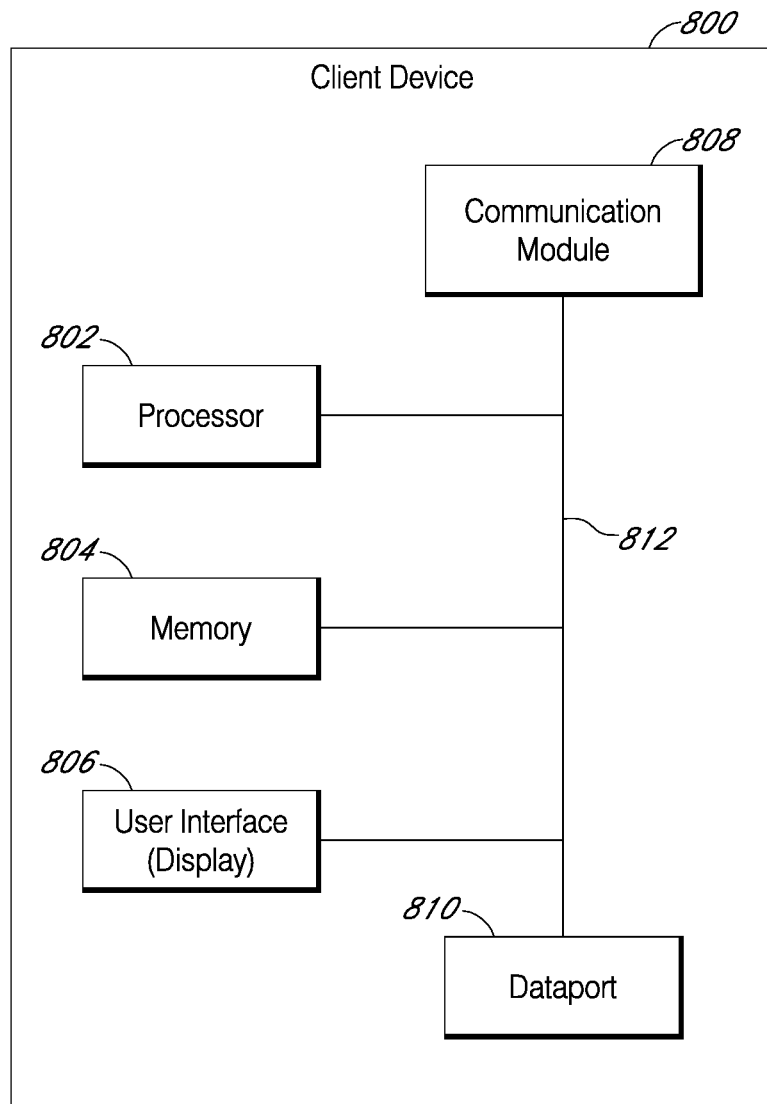
FIG. 21 is a functional block diagram of a client device on which the present embodiments may be implemented according to various aspects of the present disclosure.

FIG. 21 is a functional block diagram of a client device 800 on which the present embodiments may be implemented according to various aspects of the present disclosure. The user's client device 114 described with reference to FIG. 1 may include some or all of the components and/or functionality of the client device 800. The client device 800 may comprise, for example, a smartphone.

With reference to FIG. 21, the client device 800 includes a processor 802, a memory 804, a user interface 806, a communication module 808, and a dataport 810. These components are communicatively coupled together by an interconnect bus 812. The processor 802 may include any processor used in smartphones and/or portable computing devices, such as an ARM processor (a processor based on the RISC (reduced instruction set computer) architecture developed by Advanced RISC Machines (ARM).). In some embodiments, the processor 802 may include one or more other processors, such as one or more conventional microprocessors, and/or one or more supplementary co-processors, such as math co-processors.

The memory 804 may include both operating memory, such as random access memory (RAM), as well as data storage, such as read-only memory (ROM), hard drives, flash memory, or any other suitable memory/storage element. The memory 804 may include removable memory elements, such as a CompactFlash card, a MultiMediaCard (MMC), and/or a Secure Digital (SD) card. In some embodiments, the memory 804 may comprise a combination of magnetic, optical, and/or semiconductor memory, and may include, for example, RAM, ROM, flash drive, and/or a hard disk or drive. The processor 802 and the memory 804 each may be, for example, located entirely within a single device, or may be connected to each other by a communication medium, such as a USB port, a serial port cable, a coaxial cable, an Ethernet-type cable, a telephone line, a radio frequency transceiver, or other similar wireless or wired medium or combination of the foregoing. For example, the processor 802 may be connected to the memory 804 via the dataport 810.

The user interface 806 may include any user interface or presentation elements suitable for a smartphone and/or a portable computing device, such as a keypad, a display screen, a touchscreen, a microphone, and a speaker. The communication module 808 is configured to handle communication links between the client device 800 and other, external devices or receivers, and to route incoming/outgoing data appropriately. For example, inbound data from the dataport 810 may be routed through the communication module 808 before being directed to the processor 802, and outbound data from the processor 802 may be routed through the communication module 808 before being directed to the dataport 810. The communication module 808 may include one or more transceiver modules capable of transmitting and receiving data, and using, for example, one or more protocols and/or technologies, such as GSM, UMTS (3GSM), IS-95 (CDMA one), IS-2000 (CDMA 2000), LTE, FDMA, TDMA, W-CDMA, CDMA, OFDMA, Wi-Fi, WiMAX, or any other protocol and/or technology.

The dataport 810 may be any type of connector used for physically interfacing with a smartphone and/or a portable computing device, such as a mini-USB port or an IPHONE®/IPOD® 30-pin connector or LIGHTNING® connector. In other embodiments, the dataport 810 may include multiple communication channels for simultaneous communication with, for example, other processors, servers, and/or client terminals.

The memory 804 may store instructions for communicating with other systems, such as a computer. The memory 804 may store, for example, a program (e.g., computer program code) adapted to direct the processor 802 in accordance with the present embodiments. The instructions also may include program elements, such as an operating system. While execution of sequences of instructions in the program causes the processor 802 to perform the process steps described herein, hard-wired circuitry may be used in place of, or in combination with, software/firmware instructions for implementation of the processes of the present embodiments. Thus, the present embodiments are not limited to any specific combination of hardware and software.

Figure 22:
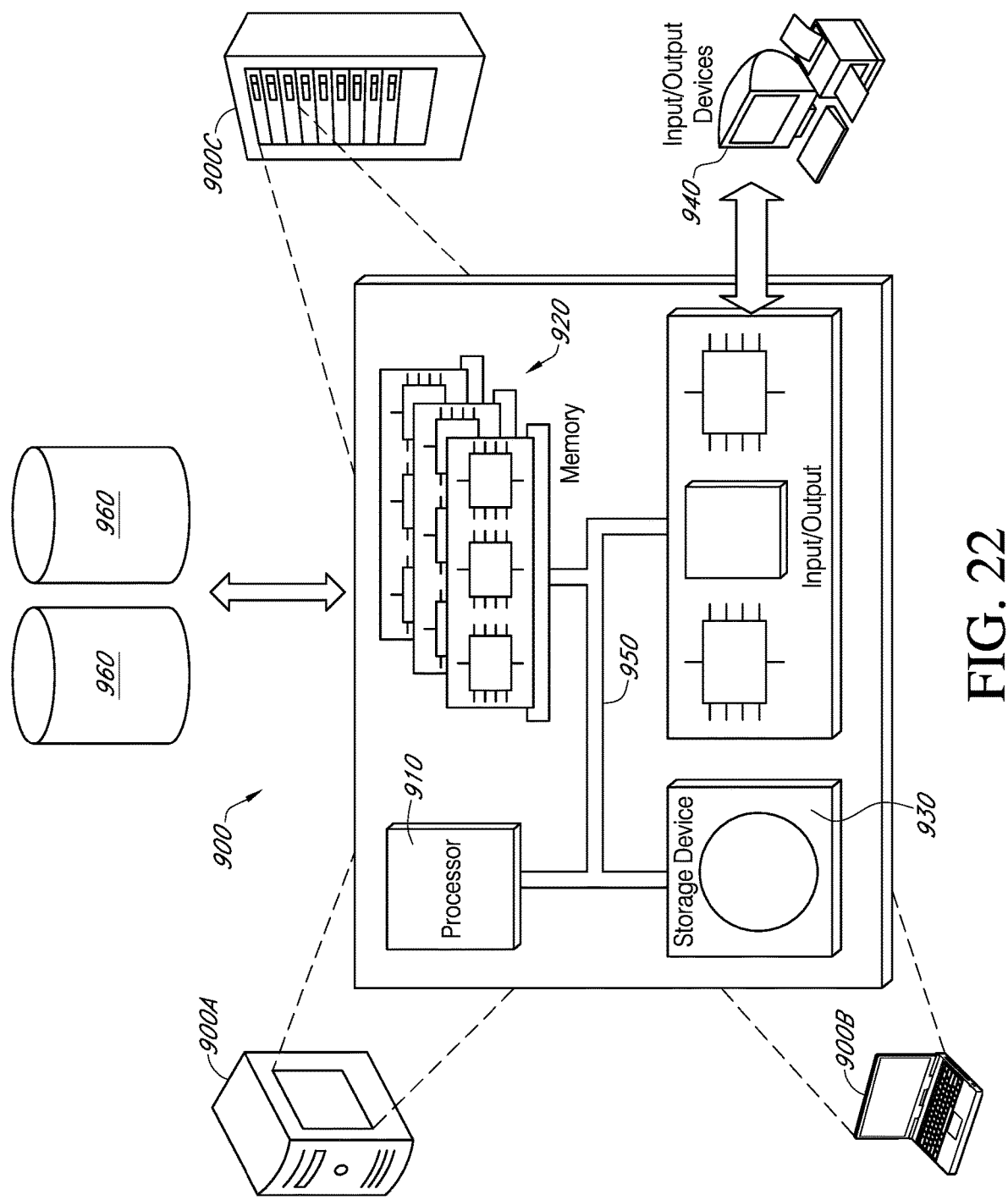
FIG. 22 is a functional block diagram of a general-purpose computing system on which the present embodiments may be implemented according to various aspects of present disclosure.

FIG. 22 is a functional block diagram of a general-purpose computing system on which the present embodiments may be implemented according to various aspects of the present disclosure. The computer system 900 may be embodied in at least one of a personal computer (also referred to as a desktop computer) 900A, a portable computer (also referred to as a laptop or notebook computer) 900B, and/or a server 900C. A server is a computer program and/or a machine that waits for requests from other machines or software (clients) and responds to them. A server typically processes data. The purpose of a server is to share data and/or hardware and/or software resources among clients. This architecture is called the client-server model. The clients may run on the same computer or may connect to the server over a network. Examples of computing servers include database servers, file servers, mail servers, print servers, web servers, game servers, and application servers. The term server may be construed broadly to include any computerized process that shares a resource to one or more client processes.

The computer system 900 may execute at least some of the operations described above. The computer system 900 may include at least one processor 910, memory 920, at least one storage device 930, and input/output (I/O) devices 940. Some or all of the components 910, 920, 930, 940 may be interconnected via a system bus 950. The processor 910 may be single- or multi-threaded and may have one or more cores. The processor 910 may execute instructions, such as those stored in the memory 920 and/or in the storage device 930. Information may be received and output using one or more I/O devices 940.

The memory 920 may store information, and may be a computer-readable medium, such as volatile or non-volatile memory. The storage device(s) 930 may provide storage for the system 900, and may be a computer-readable medium. In various aspects, the storage device(s) 930 may be a flash memory device, a hard disk device, an optical disk device, a tape device, or any other type of storage device.

The I/O devices 940 may provide input/output operations for the system 900. The I/O devices 940 may include a keyboard, a pointing device, and/or a microphone. The I/O devices 940 may further include a display unit for displaying graphical user interfaces, a speaker, and/or a printer. External data may be stored in one or more accessible external databases 960.

The features of the present embodiments described herein may be implemented in digital electronic circuitry, and/or in computer hardware, firmware, software, and/or in combinations thereof. Features of the present embodiments may be implemented in a computer program product tangibly embodied in an information carrier, such as a machine-readable storage device, and/or in a propagated signal, for execution by a programmable processor. Embodiments of the present method steps may be performed by a programmable processor executing a program of instructions to perform functions of the described implementations by operating on input data and generating output.

The features of the present embodiments described herein may be implemented in one or more computer programs that are executable on a programmable system including at least one programmable processor coupled to receive data and/or instructions from, and to transmit data and/or instructions to, a data storage system, at least one input device, and at least one output device. A computer program may include a set of instructions that may be used, directly or indirectly, in a computer to perform a certain activity or bring about a certain result. A computer program may be written in any form of programming language, including compiled or interpreted languages, and it may be deployed in any form, including as a stand-alone program or as a module, component, subroutine, or other unit suitable for use in a computing environment.

Suitable processors for the execution of a program of instructions may include, for example, both general and special purpose processors, and/or the sole processor or one of multiple processors of any kind of computer. Generally, a processor may receive instructions and/or data from a read only memory (ROM), or a random access memory (RAM), or both. Such a computer may include a processor for executing instructions and one or more memories for storing instructions and/or data.

Generally, a computer may also include, or be operatively coupled to communicate with, one or more mass storage devices for storing data files. Such devices include magnetic disks, such as internal hard disks and/or removable disks, magneto-optical disks, and/or optical disks. Storage devices suitable for tangibly embodying computer program instructions and/or data may include all forms of non-volatile memory, including for example semiconductor memory devices, such as EPROM, EEPROM, and flash memory devices, magnetic disks such as internal hard disks and removable disks, magneto-optical disks, and CD-ROM and DVD-ROM disks. The processor and the memory may be supplemented by, or incorporated in, one or more ASICs (application-specific integrated circuits).

To provide for interaction with a user, the features of the present embodiments may be implemented on a computer having a display device, such as an LCD (liquid crystal display) monitor, for displaying information to the user. The computer may further include a keyboard, a pointing device, such as a mouse or a trackball, and/or a touchscreen by which the user may provide input to the computer.

The features of the present embodiments may be implemented in a computer system that includes a back-end component, such as a data server, and/or that includes a middleware component, such as an application server or an Internet server, and/or that includes a front-end component, such as a client computer having a graphical user interface (GUI) and/or an Internet browser, or any combination of these. The components of the system may be connected by any form or medium of digital data communication, such as a communication network. Examples of communication networks may include, for example, a LAN (local area network), a WAN (wide area network), and/or the computers and networks forming the Internet.

The computer system may include clients and servers. A client and server may be remote from each other and interact through a network, such as those described herein. The relationship of client and server may arise by virtue of computer programs running on the respective computers and having a client-server relationship to each other.

The above description presents the best mode contemplated for carrying out the present embodiments, and of the manner and process of practicing them, in such full, clear, concise, and exact terms as to enable any person skilled in the art to which they pertain to practice these embodiments. The present embodiments are, however, susceptible to modifications and alternate constructions from those discussed above that are fully equivalent. Consequently, the present invention is not limited to the particular embodiments disclosed. On the contrary, the present invention covers all modifications and alternate constructions coming within the spirit and scope of the present disclosure. For example, the steps in the processes described herein need not be performed in the same order as they have been presented, and may be performed in any order(s). Further, steps that have been presented as being performed separately may in alternative embodiments be performed concurrently. Likewise, steps that have been presented as being performed concurrently may in alternative embodiments be performed separately.

What is claimed is:

1. An audio/video recording and communication device (A/V device), comprising:
 a housing including:
  a rearward portion having a height less than 94.37 mm, a width less than 47.59 mm, and a depth less than 40.20 mm, and a connector sized and shaped to receive a power source when the A/V recording device is installed at a junction box, and
  a front face plate secured to the rearward portion to define an enclosure,
   the front face plate including at least two apertures that align with respective junction-box apertures in respective tabs of the junction box when the A/V device is installed at the junction box,
   the front face plate having a height and width greater than the enclosure, a rear surface of the front face plate abutting a surface of a wall to which the junction box is installed when the A/V device is installed at the junction box;
 a camera having a field of view extending outwardly of a first front opening of the front face plate;
 a speaker adjacent the front face plate to emit sound outward from the front face plate;
 a front button aligned with a second opening of the front face plate;
 a microphone aligned with a third opening of the front face plate; and
 a power manager located within the enclosure and coupled to the connector and in electrical communication with at least the camera, speaker, and microphone.

2. The A/V device of claim 1, the rearward portion including a forward lip portion extending around a front opening of the rearward portion.

3. The A/V device of claim 2, wherein the forward lip portion comprises perimeter dimensions that create an interference fit with the junction box when the A/V device is installed at the junction box.

4. The A/V device of claim 2, wherein the forward lip portion has a height of about 96.62 mm, and a width of about 50.62 mm.

5. The A/V device of claim 1, wherein the A/V device comprises a doorbell.

6. The A/V device of claim 1, further comprising a shield positioned forward of the first opening of the front face plate.

7. The A/V device of claim 6, wherein the shield includes an upper opening adjacent the camera and aligned with the first opening of the front face plate.

8. The A/V device of claim 7, wherein the shield includes a lower opening encircling the front button and aligned with the second opening of the front face plate.

9. The A/V device of claim 8, wherein the shield includes a central opening located between the upper opening and the lower opening and aligned with the third opening of the front face plate.

10. The A/V device of claim 1, further comprising a replaceable shell overlying the front face plate, the shell including one or more mating features to assist in maintaining the shell about the front face plate.

11. The A/V device of claim 10, wherein the shell includes a central opening.

12. The A/V device of claim 11, wherein the central opening in the shell is sized and shaped to accommodate a shield located in front of the front face plate.

13. The A/V device of claim 12, wherein the shield resides within the central opening in the shell such that a front surface of the shield is substantially flush with a front surface of the shell.

14. The A/V device of claim 1, further comprising an infrared (IR) light source located at least partially within the enclosure.

15. The A/V device of claim 14, wherein the IR light source comprises at least one IR LED (light-emitting diode).

16. The A/V device of claim 15, wherein the IR light source comprises a first IR LED and a second IR LED located on opposite sides of the front button.

17. The A/V device of claim 1, further comprising a motion sensor.

18. The A/V device of claim 17, wherein the motion sensor is located behind the front button.

19. The A/V device of claim 18, wherein the front button comprises a Fresnel lens patterned to direct incoming light into the motion sensor located behind the front button.

20. The A/V device of claim 1, further comprising a communication module.

21. The A/V device of claim 1, wherein the camera is located above the front button.

22. The A/V device of claim 21, wherein the speaker is located below the front button.

23. The A/V device of claim 1, wherein the rearward portion of the housing includes at least one of an upper channel and a lower channel configured to accommodate, respectively, the tabs on the junction box to facilitate inserting the rearward portion into the junction box through a front opening of the junction box.

24. The A/V device of claim 1, wherein the height, the width, and the depth of the rearward portion varies within a manufacturing tolerance of minus 1 mm.

25. The A/V device of claim 1, the connector being an Ethernet port, the wire being an Ethernet cable having Power over Ethernet.

26. The A/V device of claim 1, the connector being a two-pin connector sized and shaped to receive a mating connector at ends of electrical wires of an AC power supply of the structure.

27. The A/V device of claim 1, wherein the connector does not protrude from the outer envelope of the rearward portion.

28. An audio/video recording and communication device (A/V device), comprising:
a housing including:
a rearward portion having a height less than 94.37 mm, a width less than 47.59 mm, and a depth less than 40.20 mm, and
a front face plate secured to the rearward portion to define an enclosure,
the front face plate including at least two apertures that align with respective junction-box apertures in respective tabs of the junction box when the A/V device is installed at the junction box,
the front face plate having a height and width greater than the enclosure, a rear surface of the front face plate abutting a surface of a wall to which the junction box is installed when the A/V device is installed at the junction box,
a portion of the housing interfacing with the junction box to resist moisture intrusion into the junction box when the A/V device is installed at the junction box;
a camera having a field of view extending outwardly of a first opening of the front face plate;
a speaker adjacent the front face plate to emit sound outward from the front face plate;
a front button aligned with a second opening of the front face plate; and
a microphone aligned with a third opening of the front face plate.

* * * * *